(12) United States Patent
Abrol et al.

(10) Patent No.: US 7,606,266 B2
(45) Date of Patent: Oct. 20, 2009

(54) HDLC HARDWARE ACCELERATOR

(75) Inventors: Nischal Abrol, San Diego, CA (US); Jian Lin, San Diego, CA (US); Hanfang Pan, San Diego, CA (US); Simon Turner, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 528 days.

(21) Appl. No.: 11/431,804

(22) Filed: May 10, 2006

(65) Prior Publication Data
US 2006/0203797 A1 Sep. 14, 2006

Related U.S. Application Data

(62) Division of application No. 10/086,576, filed on Feb. 28, 2002.

(51) Int. Cl.
*H04J 3/00* (2006.01)
(52) U.S. Cl. ............. 370/476; 370/470; 370/472; 370/522; 714/757; 714/758; 714/776; 714/781; 714/807
(58) Field of Classification Search ............. 370/470, 370/472, 476, 522; 714/757, 758, 776, 781, 714/807, 774
See application file for complete search history.

(56) References Cited

U.S. PATENT DOCUMENTS

| | | | |
|---|---|---|---|
| 4,703,478 A | 10/1987 | Haselton et al. | |
| 5,325,372 A * | 6/1994 | Ish-Shalom | 714/757 |
| 5,571,718 A | 11/1996 | Yip et al. | |
| 5,638,370 A | 6/1997 | Seconi et al. | |
| 5,671,223 A | 9/1997 | Shacher et al. | |
| 5,671,237 A * | 9/1997 | Zook | 714/755 |

(Continued)

FOREIGN PATENT DOCUMENTS

EP 0444832 9/1991

(Continued)

OTHER PUBLICATIONS

W. Simpson, "PPP in HDLC-Like Framing," Network Working Group, Jul. 1994, pp. 1-24.

(Continued)

*Primary Examiner*—William Trost, IV
*Assistant Examiner*—Toan D Nguyen
(74) *Attorney, Agent, or Firm*—Howard H. Seo; Darren M. Simon

(57) ABSTRACT

An HDLC accelerator includes a deframer and framer to respectively accelerate the deframing and framing processes for PPP packets. The deframer includes an input interface unit, a detection unit, a conversion unit, and an output interface unit. The input interface unit receives a packet of data to be deframed. The detection unit evaluates each data byte to detect for special bytes (e.g., flag, escape, and invalid bytes). The conversion unit deframes the received data by removing flag and escape bytes, "un-escaping" the data byte following each escape byte, providing a header word for each flag byte, and checking each deframed packet based on a frame check sequence (FCS) value associated with the packet. The output interface unit provides deframed data and may further perform byte alignment in providing the deframed data. A state control unit provides control signals indicative of specific tasks to be performed for deframing.

20 Claims, 16 Drawing Sheets

U.S. PATENT DOCUMENTS

| | | | |
|---|---|---|---|
| 5,724,368 | A | 3/1998 | Zook |
| 5,978,386 | A | 11/1999 | Hamalainen et al. |
| 6,212,660 | B1 | 4/2001 | Joeressen et al. |
| 6,249,525 | B1 | 6/2001 | Aggrawal et al. |
| 6,295,626 | B1 * | 9/2001 | Nair et al. .................. 714/807 |
| 6,493,766 | B1 | 12/2002 | Buchholz et al. |
| 6,788,652 | B1 | 9/2004 | Hwang |
| 6,836,869 | B1 * | 12/2004 | Wyland ...................... 714/781 |
| 6,982,963 | B2 | 1/2006 | Asahina |
| 7,009,978 | B2 | 3/2006 | Kofoed et al. |
| 7,096,261 | B2 | 8/2006 | Abrol et al. |
| 2002/0144208 | A1 * | 10/2002 | Gallezot et al. ............. 714/781 |

FOREIGN PATENT DOCUMENTS

| | | |
|---|---|---|
| EP | 0602806 | 6/1994 |
| WO | 02073910 | 9/2002 |

OTHER PUBLICATIONS

Roginsky, Allen L., et al.: "Efficient Computation of Packet CRC From Partial CRCs With Application To The Cells-In-Frames Protocol;" Computer Communications, Elsevier Science Publishers BV, Amsterdam, NL, vol. 21, No. 7, Jun. 15, 1998, pp. 654-661, XP004132233.

* cited by examiner

HDLC HARDWARE ACCELERATOR

CLAIM OF PRIORITY UNDER 35 U.S.C. §120

The present Application for Patent is a divisional of patent application Ser. No. 10/086,576 entitled "HDLC HARDWARE ACCELERATOR" filed Feb. 28, 2002, pending, and assigned to the assignee hereof and hereby expressly incorporated by reference herein.

BACKGROUND

1. Field

The present invention relates generally to data communication, and more specifically to a "High-level Data Link Control" (HDLC) hardware accelerator for framing and deframing PPP packets.

2. Background

The explosive growth of computer networks, such as the Internet, has spawned demands for high data rate infrastructures that can support the enormous amount of data traffic generated by these networks. Approximately concurrent with the growth of the Internet is the deployment and acceptance of wireless communication systems capable of supporting a variety of services. Newer-generation wireless communication systems are designed to efficiently provide data and voice communication, including data traffic generated by the Internet.

A data communication between a client and a server is typically achieved via a number of communication and network elements. For example, to remotely access a server over a wireless link, a terminal may communicate via the wireless link with an access point, which may further communicate with the server via routers, hubs, bridges, and so on. These elements communicate with each other via specific protocols that may be defined based on an open model or a proprietary model.

Standard Internet data communication is typically supported via a Transmission Control Protocol (TCP) layer that operates on top of an Internet Protocol (IP) layer, which may further operate on top of a Point-to-Point Protocol (PPP) layer. These layers are defined by the Open Systems Interconnection Reference Model, which is commonly referred to as the OSI model and is well known in the art. Wireless communication may be supported via a Radio Link Protocol (RLP) layer that operates on top of a physical layer such as, for example, a high data rate (HDR) layer defined by IS-856.

Wireless communication devices may thus be required to support PPP for packet data communication and RLP for wireless communication. Each protocol layer specifically defines the format for that protocol's transmission unit, which is a "packet" for the RLP layer and a "frame" for the PPP layer. Each PPP frame is typically generated by encapsulating a PPP packet.

Conventionally, the processing of RLP packets to recover PPP packet data and the processing of RLP packet data to form PPP packets are performed by software executed on a processor. To recover the PPP packet data in each RLP packet, the software typically needs to retrieve each byte of the RLP packet, determine whether any processing needs to be performed on the byte, and then perform the necessary processing (if any). The "conversion" of data between PPP and RLP can consume a large percentage of the processing capability of the processor. This would then necessitate a faster processor for the wireless communication device and/or limit the functions and features that may be provided by the device. Moreover, additional memory is typically required to perform the conversion in software.

There is therefore a need in the art for a hardware accelerator that can recover PPP packet data from RLP packets and form PPP packets from RLP packet data.

SUMMARY

An HDLC accelerator is provided herein to accelerate the deframing and framing processes for PPP packets. In particular, a dedicated hardware HDLC deframer is provided to deframe RLP packets to recover PPP packet data, and a dedicated hardware HDLC framer is provided to frame PPP packets from RLP packet data. The deframer and framer include sufficient hardware circuitry so that minimal software control is needed to respectively perform deframing and framing.

A specific embodiment provides a deframer for use in a wireless communication device. The deframer includes an input interface unit, a detection unit, a conversion unit, and an output interface unit. The input interface unit receives, e.g., an RLP packet of data to be deframed, one word at a time, and for each received word provides one data byte at a time for subsequent processing. The RLP packet includes one or more complete and/or partial PPP packets having a format defined by Internet standard RFC1662. The detection unit evaluates each data byte from the input interface unit to detect for special bytes (e.g., flag, escape, and invalid bytes). The conversion unit deframes the data from the interface unit by removing flag and escape bytes, "un-escaping" the data byte following each escape byte (e.g., by XORing the data byte with "0x20"), providing a header word for each flag byte, and checking each deframed packet based on a frame check sequence (FCS) value associated with the packet. The output interface unit provides deframed data and may further perform byte alignment in providing the deframed data. The deframer may also include a state control unit operative to provide control signals indicative of specific tasks to be performed for deframing (e.g., header insertion, escape byte removal, and so on)

Another specific embodiment provides a framer for use in a wireless communication device. The framer includes an input interface unit, a detection unit, a conversion unit, and an output interface unit. The input interface unit receives a packet of data to be framed, one word at a time, and for each received word provides one data byte at a time for subsequent processing. The detection unit evaluates each data byte from the input interface unit to detect for bytes of specific values (e.g., bytes that need to be escaped). The conversion unit frames the data from the interface unit by inserting an escape byte for each data byte to be escaped and escaping the data byte, inserting a flag byte in response to receiving a command to insert the flag byte, and inserting an FCS value in response to receiving a command to insert the FCS value. The output interface unit provides framed data having a format defined by RFC1662. The framer may also include a state control unit operative to provide control signals indicative of specific tasks to be performed for framing (e.g., flag insertion, escape byte insertion, FCS insertion, and so on).

Various aspects and embodiments of the invention are described in further detail below. The invention further provides digital signal processors, integrated circuits, methods, wireless communication devices, terminals, base stations, systems, and other apparatuses and elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
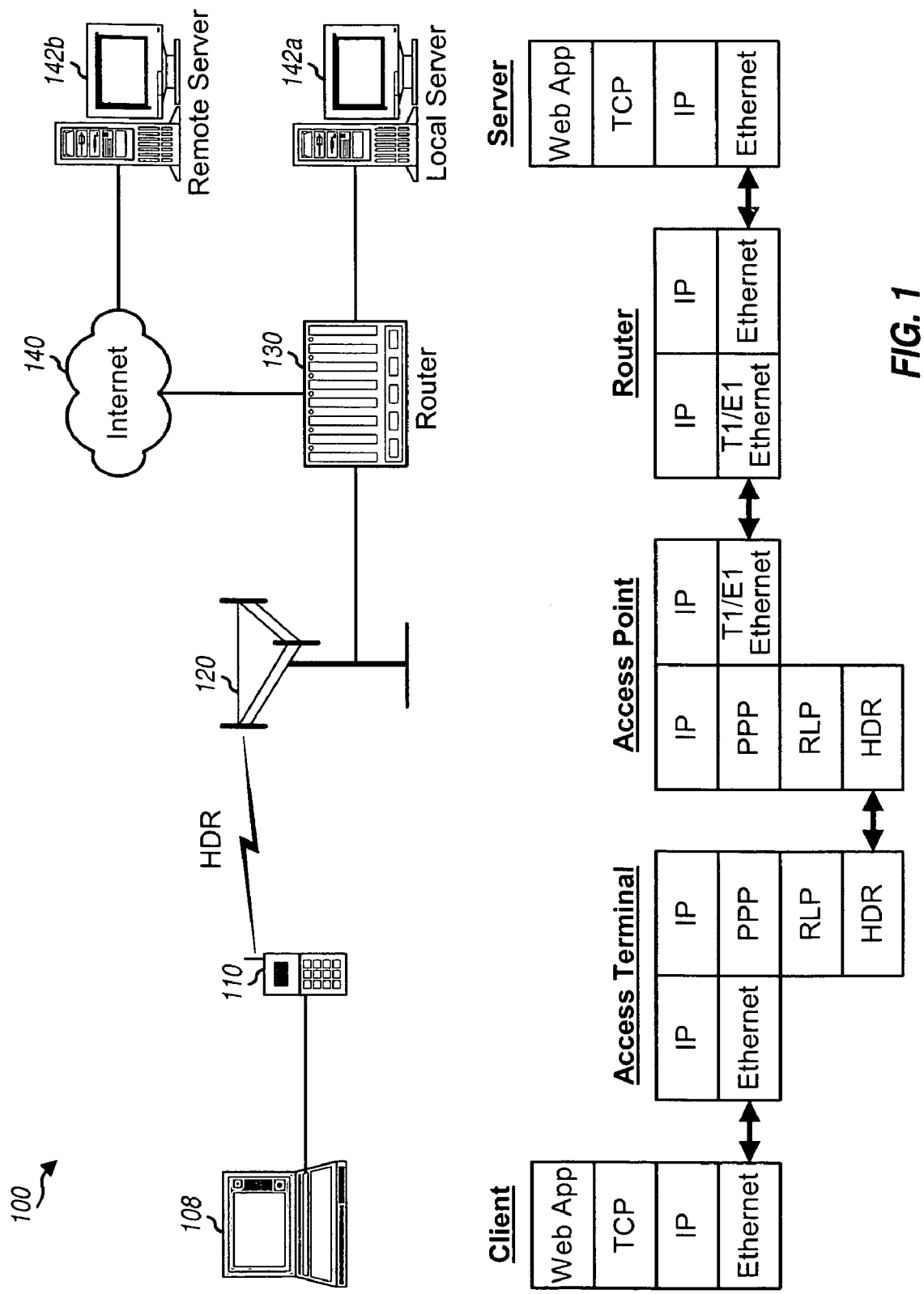
FIG. 1 is a diagram of an embodiment of a communication system capable of supporting voice and data communication.

FIG. 1 is a diagram of an embodiment of a communication system 100 capable of supporting voice and data communication. System 100 may be used to provide, for example, wireless Internet services in fixed, portable, and mobile environments. System 100 includes a number of access terminals 110 that may interface with various devices 108 via wireline and/or wireless links (only one terminal and one device are shown in FIG. 1 for simplicity). Devices 108 may be computers, appliances, personal digital assistants (PDAs), set-top boxes, printers, and so on.

Each access terminal 110 communicates with one or more access points 120 over a wireless link (again, only one access point is shown in FIG. 1 for simplicity). The air-link between the access terminals and access points may be achieved based on various technologies (e.g., CDMA, TDMA, FDMA, and so on) and using various designs. Each access point 120 supports data transmission for a number of access terminals 110 located within its coverage area. Each access point 120 may further couple to one or more routers 130 via high-speed communication links (e.g., T1/E1 or Ethernet). Each router 130 directs traffics among the access points and other network elements (e.g., a local server 142a) and networks (e.g., an IP network 140) coupled to it. IP network 140 may further couple to other network elements (e.g., a remote server 142b), a local area network (LAN), a packet data serving node (PDSN), and so on.

Access terminal 110 may be implemented in various physical embodiments such as, for example, a terminal, a cellular phone, a handset, a modem, a module, and so on. Access terminal 110 includes a wireless modem and a data interface that allow a user to access a server via a wireless (e.g., CDMA) network. The data interface allows access terminal 110 to interface with other devices via a wireless and/or wireline link.

FIG. 1 also shows a specific embodiment of a protocol stack for communication system 100 during a web browsing session. The user may execute a web browser application on the user's computer (the client) to access data stored on a server such as local server 142a or remote server 142b. After a web browsing session has been established, the protocol stack for various elements in the communication path from client 108 to servers 142 may be as shown at the bottom of FIG. 1.

The protocol stack shown in FIG. 1 represents a specific implementation. The client and server execute web applications that run on top of TCP and IP, which support the communication between the client and servers. The communication between the client and the access terminal may be achieved via Ethernet or some other interface. The communication between the access terminal and access point may be achieved via IP and PPP (which are standard Internet protocols) on top of RLP and HDR (which are air-link protocols). The communication between other network elements may be achieved as shown in FIG. 1. Other protocols may also be used to facilitate communication between the client and server.

Figure 2:
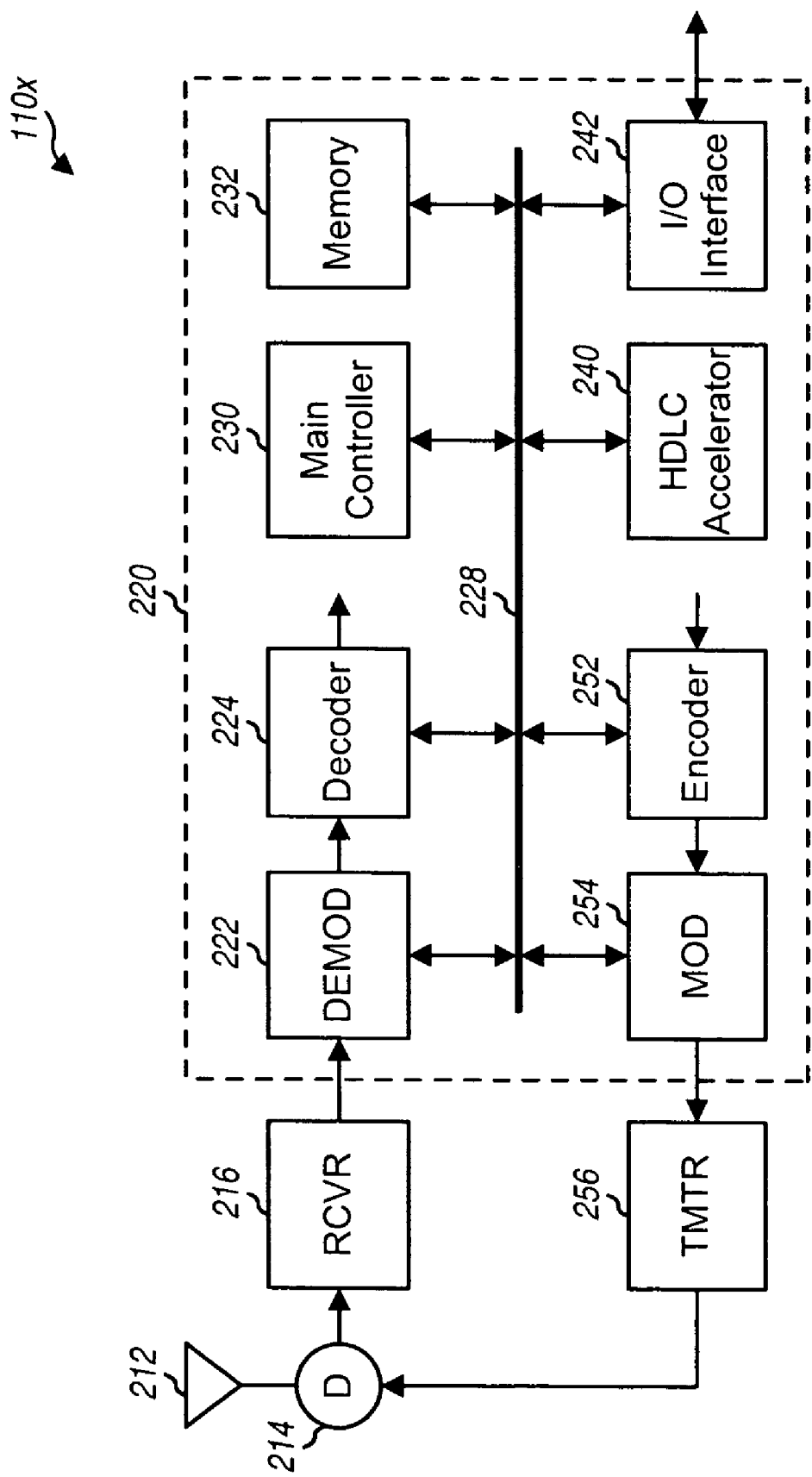
FIG. 2 is a block diagram of a specific embodiment of an access terminal.

FIG. 2 is a block diagram of a specific embodiment of an access terminal 110x. In this embodiment, access terminal 110x is capable of providing bi-directional communication via a receive path and a transmit path.

For the receive path, one or more transmitted signals are received by an antenna 212, routed through a duplexer (D) 214, and provided to a receiver (RCVR) 216. Receiver 216 conditions (e.g., filters, amplifies, and downconverts) the received signal and digitizes the conditioned signal to provide data samples. A demodulator (DEMOD) 222 then processes the data samples to provide demodulated data. For a CDMA system, the processing by demodulator 222 may include (1) despreading the data samples with a pseudo-random noise (PN) sequence or a descrambling code, (2) decovering the despread data with a channelization code (e.g., a Walsh code or an OVSF code), and (3) data demodulating the decovered data with a recovered pilot to provide the demodulated data.

A decoder 224 then deinterleaves and decodes each data frame or packet in accordance with a deinterleaving and decoding scheme that is complementary to the interleaving and coding scheme used at the transmitter system. For example, Viterbi, Turbo, and/or block decoding may be performed if convolutional, Turbo, and/or block coding, respectively, is performed at the transmitter system. The decoded data may further be checked for frame error based on a cyclic redundancy check (CRC) code, which is commonly used in CDMA systems. The decoded data may be provided to a main controller 230 and/or stored to a storage unit (e.g., a memory 232).

For the transmit path, data to be transmitted from access terminal 110x is provided to an encoder 252 for processing.

Encoder 252 codes the received data in accordance with a particular coding scheme, which may including any combination of CRC, convolutional, Turbo, and/or block coding. The coded data is then interleaved in accordance with a particular interleaving scheme, and the interleaved data is further processed by a modulator (MOD) 254. For a CDMA system, the processing by modulator 254 may include covering the data with a channelization code and spreading the covered data with a PN sequence or a scrambling code. The modulated data is then conditioned (e.g., filtered, amplified, and upconverted) by a transmitter (TMTR) 256 to provide a modulated signal, which is then routed through duplexer 214 and transmitted via antenna 212.

Main controller 230 may perform various processing functions for voice/data communication and may also be used to direct the operation of various processing units within access terminal 110x. Main controller 230 may be implemented based on various designs such as a reduced instruction set computing (RISC) processor, a complex instruction set computing (CISC) processor, and so on. A "High-level Data Link Control" (HDLC) accelerator 240 processes packet data in one protocol to recover or form packets in another protocol, as described in further detail below. An input/output (I/O) interface unit 242 provides interface to external device 108 (e.g., a computer).

In the embodiment shown in FIG. 2, a system bus 228 interconnects various processing units within access terminal 110x. System bus 228 may be implemented as an Advanced System Bus (ASB), an Advanced Peripheral Bus (APB), or some other bus design. Some of the processing units may be implemented within an application specific integrated circuit (ASIC). For example, an ASIC 220 may be designed to include the processing units 222 through 254 in FIG. 2.

As shown in FIG. 1, the access terminal may be designed to support IP, PPP, RLP, and HDR for communication with the access point. Each protocol specifically defines the format for that protocol's transmission unit, which is a "packet" for RLP and a "frame" for PPP. Each PPP frame is typically formed by encapsulating a PPP packet with a header and/or a trailer.

Figure 3A:
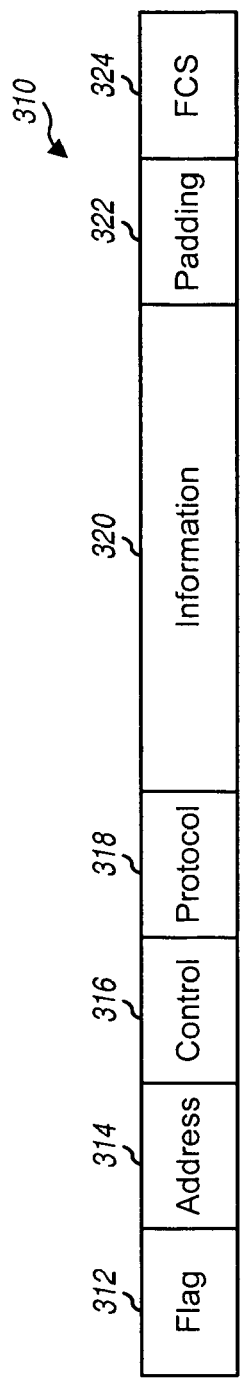
FIG. 3A is a diagram illustrating a frame format based on a PPP HDLC-like frame structure described in Internet standard RFC1662.

FIG. 3A is a diagram illustrating a frame format 310 based on a PPP HDLC-like frame structure described in Internet standard RFC1662, entitled "PPP in HDLC-like Framing", which is incorporated herein by reference. The frame format includes a flag field 312, an address field 314, a control field 316, a protocol field 318, an information field 320, a padding field 322, and a frame check sequence (FCS) field 324. Flag field 312 indicates the start or end of a PPP packet and has a value of "0x7e". FCS field 324 includes a 16-bit or 32-bit value generated based on the data in fields 314 through 322. This FCS value is used to determine whether or not the PPP packet was received correctly or in error. All other fields are defined in the aforementioned RFC1662 document.

A PPP packet is the basic data unit passed from an upper layer to the PPP layer and is the data payload of a PPP frame. The PPP packet data is "framed" to obtain a PPP frame that is then the data payload of a lower layer (e.g., the RLP layer). An RLP packet is the payload of the RLP layer, and may include one or multiple partial and/or complete PPP frames, with each PPP frame containing one PPP packet, which is the data payload of the PPP frame.

Figure 3B:
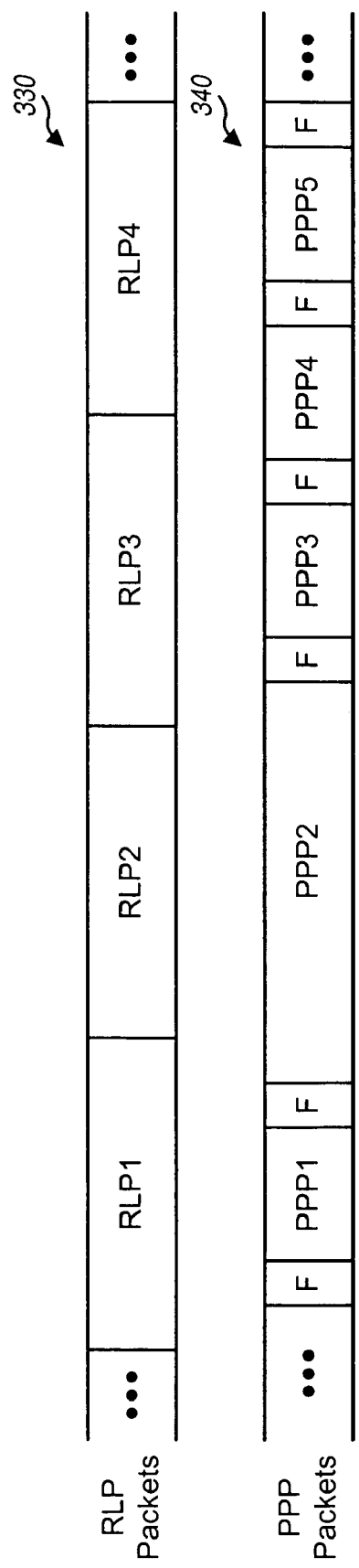
FIG. 3B is a diagram illustrating the relationship between a sequence of RLP packets and a sequence of PPP packets.

FIG. 3B is a diagram illustrating the relationship between a sequence of RLP packets 330 and a sequence of PPP frames 340. Each RLP packet is typically defined to be of a certain duration, e.g., as determined by the CDMA standard being implemented, which may be 10 msec or 20 msec. For a given data rate, each RLP packet includes a particular number of bits. In contrast, PPP frames may have variable lengths. Consequently, the boundaries of the RLP packets and PPP frames are not defined by a definite relationship. An RLP packet may include one PPP frame, multiple PPP frames, or only a portion of a PPP frame. The start of each RLP packet may be aligned to system time, and the start of each PPP frame may be designated by a flag byte (denoted as "F" in FIG. 3B and having a value of "0x7e").

Typically, data from one protocol needs to be processed to provide properly formatted data for another protocol. For example, "deframing" may be performed for a wireless data transmission received at the access terminal from the access point. In this case, at the access terminal, RLP packets are received from the physical layer and needs to be deframed to recover the PPP packet data in the RLP packets. The deframed PPP packet data is then provided to the higher layer. Conversely, framing may be performed for a wireless data transmission from the access terminal to the access point. In this case, at the access terminal, PPP packet data is received from the higher layer and framed to form framed PPP packets, which are then provided in RLP packets to the physical layer. The deframing and framing operations are described in further detail below.

Conventionally, software is used to frame and deframe PPP packet data. To perform a deframing operation to recover PPP packet data from RLP packets, one or more RLP packets may first be stored to an RLP buffer. The software then retrieves each byte in the RLP buffer, processes the byte as necessary, checks an FCS value (e.g., a CRC value) for each PPP packet, and stores the deframed PPP packet data to another buffer. This deframing process typically requires fair amount of processing power and additional storage. The framing operation to process RLP packet data to form PPP packets also requires processing power and storage.

In an aspect, an HDLC accelerator is provided to accelerate the deframing and framing processes. In particular, a dedicated hardware HDLC deframer is provided to deframe RLP packets to recover PPP packet data, and a dedicated hardware HDLC framer is provided to frame PPP packets into PPP frames according to RFC1662.

Figure 4:
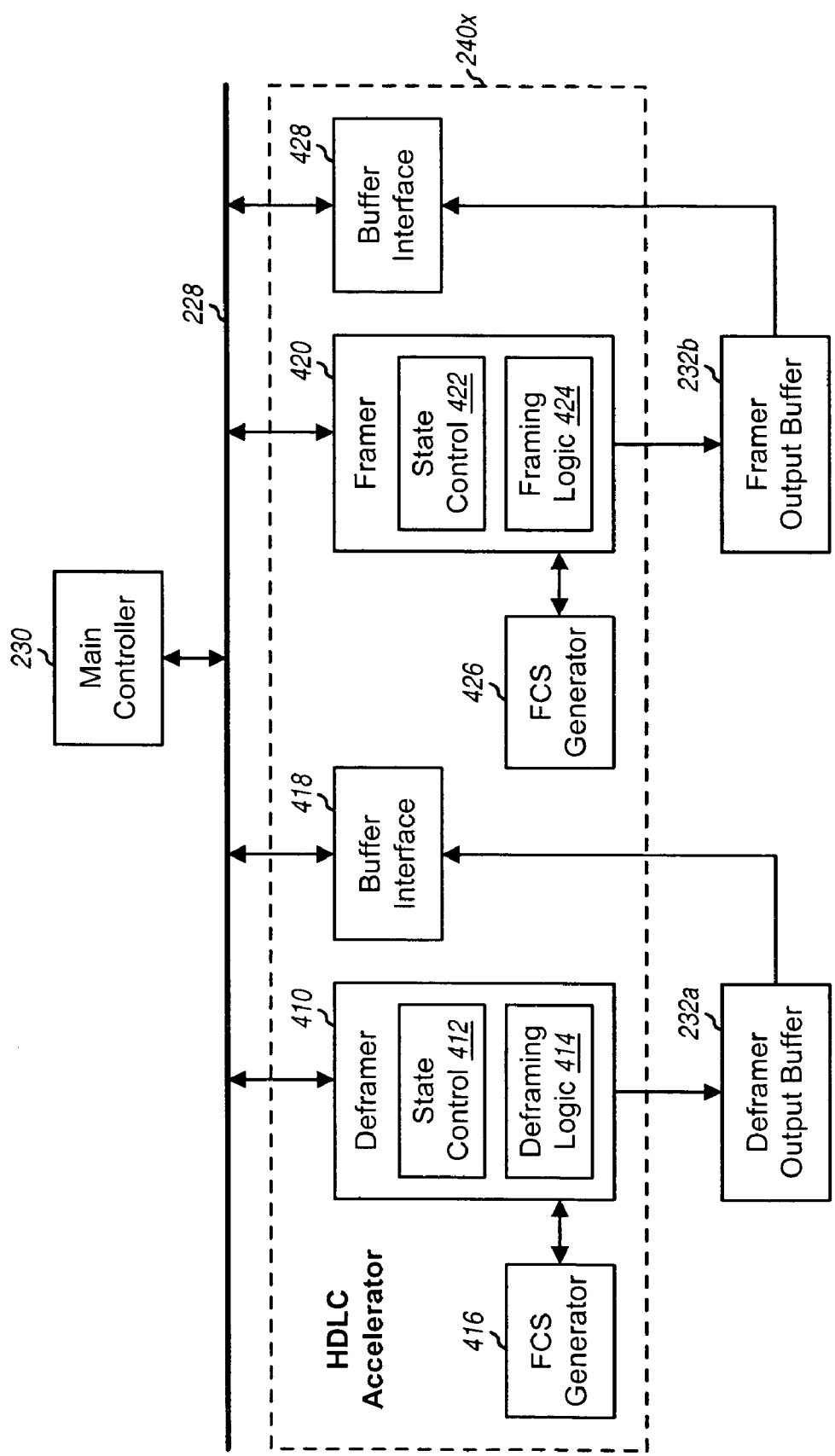
FIG. 4 is a block diagram of an HDLC accelerator that may be used to perform framing and deframing for PPP packets.

FIG. 4 is a block diagram of an HDLC accelerator 240x that may be used to perform framing and deframing for PPP packets. HDLC accelerator 240x is one embodiment of HDLC accelerator 240 in FIG. 2. HDLC accelerator 240x interfaces with main controller 230 (e.g., via system bus 228), which may direct various operations of HDLC accelerator 240x. In the embodiment shown in FIG. 4, HDLC accelerator 240x includes a deframer 410, a framer 420, FCS generators 416 and 426, and output buffer interface units 418 and 428.

Deframer 410 receives and deframes PPP packets in an RLP packet and provides deframed PPP packet data to a deframer output buffer 232a. Deframer 410 includes a state control unit 412 that controls the deframing operation and a deframing logic unit 414 that performs the actual deframing (e.g., remove flag and escape bytes in the received PPP packets, and check the FCS value for each PPP packet). Correspondingly, framer 420 receives and frames PPP packet data in an RLP packet and provides framed PPP packets to a framer output buffer 232b. Framer 420 includes a state control unit 422 that controls the framing operation and a framing logic unit 424 that performs the actual framing (e.g., insert flag and escape bytes, generate and insert an FCS value for each framed PPP packet). State control units 412 and 422 may be implemented as two separate finite state machines (FSMs) or as a single combined FSM.

FCS generators 416 and 426 are used to generate FCS values for deframing and framing operations, respectively (or one FCS generator may be shared by both the framer and deframer). For a deframing operation, the FCS value may be used to determine whether or not a PPP packet passes error checking. For a framing operation, the FCS value is appended at the end of each PPP packet. FCS generators 416 and 426 may implement CRC or some other error detection coding scheme and are described in further detail below.

Deframer and framer output buffers 232a and 232b are used to store the output of deframer 410 and framer 420, respectively. Output buffers 232a and 232b may be implemented as part of memory 232 in FIG. 2. Output buffer interface units 418 and 428 are used to read data from deframer and framer output buffers 232a and 232b, respectively. Interface units 418 and 428 may each be designed to support an access scheme whereby a single read operation may be performed to access a complete PPP packet or the entire content of the deframer and framer output buffers.

In certain embodiments, the hardware circuitry to perform the framing and deframing operations may be shared to reduce size, cost, and loading on the system bus.

HDLC accelerator 240x may be used to implement various standards, such as the aforementioned RFC1662 standard. High-level data link control is also described in a document from ISO/IEC 3309:1991(E), entitled "Information Technology—Telecommunications and information exchange between systems—High-level data link control (HDLC) procedures—Frame Structure," International Organization For Standardization, Fourth edition 1991 Jun. 1, which is incorporated herein by reference.

HDLC Deframing

For a deframing operation, the deframer is provided with an RLP packet that may include a partial PPP packet, one complete PPP packet, or multiple complete/partial PPP packets. Each complete PPP packet includes the flag, address, control, protocol, information, padding, and FCS fields, as shown in FIG. 3A. The deframer then performs the following set of tasks to deframe the PPP packets in the RLP packet:

Remove the flag bytes ("0x7e").
Remove each escape byte ("0x7d") encountered in the RLP packet and restore the subsequent byte that follows the escape byte by XORing it with "0x20".
Check the FCS for each complete PPP packet.
Perform byte alignment in storing the deframed PPP packet data to the deframer output buffer.
Store the deframed PPP packet data for the RLP packet to the deframer output buffer (e.g., using a storage format described below).

As described in the aforementioned RFC1662 standard, each PPP packet is marked on each side by a flag byte, which is removed by the deframer. During framing, certain bytes in the data being framed may have been "escaped" by (1) inserting an escape byte before each such byte, and (2) inverting the 5-th bit of such byte by XORing it with "0x20". The specific bytes to be escaped are defined by an Async-Control-Character-Map (ACCM). During deframing, the reverse operations are performed to "un-escape" these bytes. The deframing tasks are described in further detail below.

For clarity, various aspects and embodiments are described below wherein the deframing is performed on each RLP packet, and the deframed PPP packet data for each RLP packet is stored to the deframer output buffer. The deframing may also be performed on some other unit of data (i.e., a block of data of some other size), and this is within the scope of the invention.

The deframer receives an RLP packet for deframing, which may include a partial PPP packet or one or more complete and/or partial PPP packets, with each complete PPP packet comprising fields 312 through 324 shown in FIG. 3A. The deframer removes the flag byte in field 312 and escape bytes and performs other processing. The deframer then provides each deframed PPP packet comprised of fields 314 through 322 to the deframer output buffer.

Figure 5A:
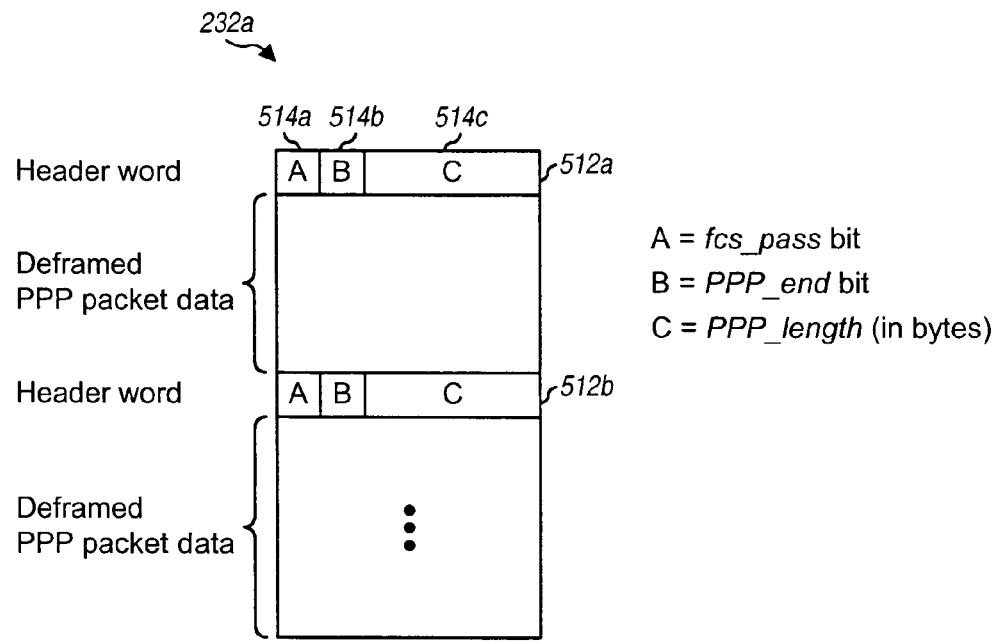
FIG. 5A is a diagram of a storage format for a deframer output buffer.

FIG. 5A is a diagram of a specific embodiment of a storage format for deframer output buffer 232a. In an embodiment, a header word is provided in the deframer output buffer for each full or partial PPP packet deframed and stored in the output buffer. In particular, a header word 512a is provided for the first deframed PPP packet, and a header word 512b is provided for each subsequent deframed PPP packet. Since the RLP packet may include one or multiple complete and/or partial PPP packets, one or multiple headers may be provided and stored in the output buffer.

Each header word includes information used by the higher layer (e.g., by software executed on main controller 230) to process the data in the deframer output buffer. In an embodiment, each header word includes three fields—an fcs_pass bit ("A") 514a, a PPP_end bit ("B") 514b, and a PPP_length (in bytes) field ("C") 514c. The fc_pass bit indicates whether or not the PPP packet passes the frame check, which is only valid if a complete PPP packet has been received. The PPP_end bit indicates whether or not the complete PPP packet is included in the current deframer output buffer. This bit is set to zero ("0") to indicate that the PPP packet will continue in the next deframer output buffer. The PPP_length field indicates the length (in bytes) of the PPP packet included in the deframer output buffer.

As shown in FIG. 5A, following each header word is the deframed PPP packet data, which may be of any length, as noted in the PPP_length field. Since one or more PPP packets may be deframed and stored in the deframer output buffer for a given RLP packet, the buffer is sized to be able to handle the worst-case scenario where many short PPP packets are included in one RLP packet.

Figure 5B:
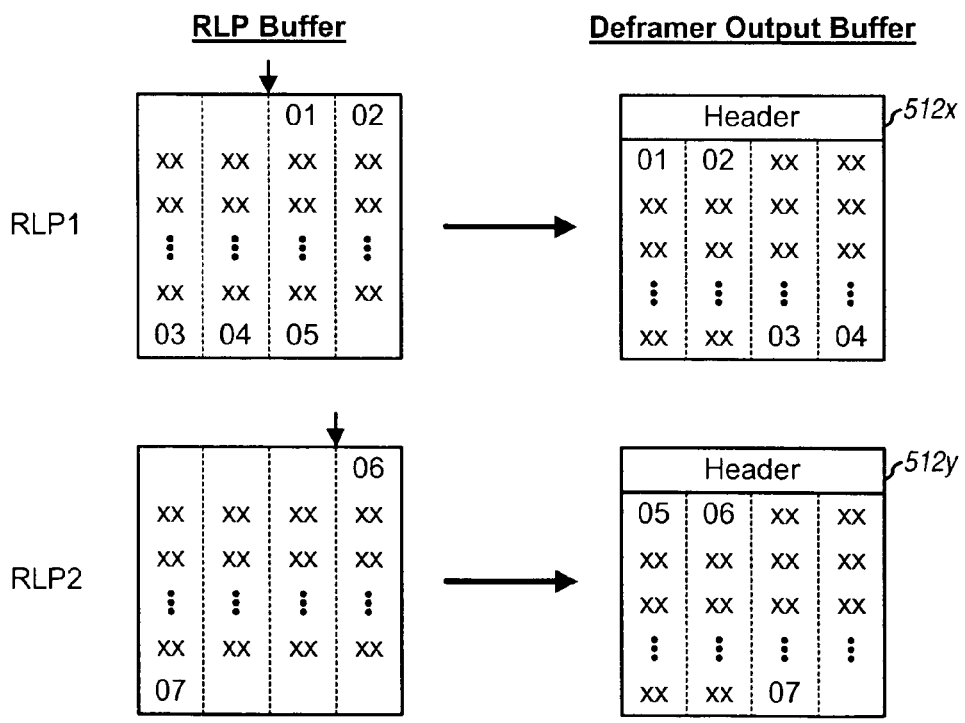
FIG. 5B is a diagram graphically illustrating the byte alignment and the relationship between the RLP buffer and the deframer output buffer.

FIG. 5B is a diagram graphically illustrating the byte alignment and relationship between the RLP buffer and the deframer output buffer for a deframing operation. In this example, two RLP packets are to be deframed sequentially. The first RLP packet is stored in the RLP buffer with a starting offset of two, as indicated by the arrow. This start offset may be provided by the higher layer. In this example, a single long PPP packet spans multiple RLP packets.

To perform the deframing operation, the first RLP packet (RLP1) is initially transferred or written to the deframer. The RLP packet may not completely fill the RLP buffer, and may not have been written to the RLP buffer starting at the first byte location or ending at the last byte location. In the example shown in FIG. 5B, the first word for RLP1 in the RLP buffer is a partial word comprised of only two bytes, "01" and "02". This partial word may be transferred to the deframer one byte at a time using byte transfer. After the word boundary has been reached, whole words may be transferred to the deframer one word at a time using word transfer, which is faster than byte transfer. In particular, a single burst write operation may be performed to transfer multiple words to the deframer (again, one word at a time). In an embodiment, a word includes four bytes, but other word lengths may also be used and are within the scope of the invention. The last three bytes of RLP1 are also transferred to the deframer using byte transfer. In an embodiment, only valid bytes in the RLP buffer are transferred to the deframer.

The first RLP packet is deframed by the deframer and stored to the deframer output buffer. As shown in FIG. 5B, for RLP1, the deframer output buffer includes a header word 512x for the PPP packet in RLP1, then data for the deframed PPP packet. In this example, since the PPP packet continues to the next RLP packet, the last byte ("05") in RLP1 is not stored to the current output buffer but is instead saved for the next output buffer. In this way, the bytes in the deframer output buffer are aligned at word boundaries, to the extent possible, which may then simplify the retrieval and processing of the data stored in the output buffer.

The second RLP packet (RLP2) is next transferred to the deframer in similar manner and processed. Again, byte transfer may be used to transfer the first word for RLP2 (which only includes byte "06"). Word transfer may then be performed for the subsequent whole words. And finally, byte transfer may be performed for the last word comprised of only one byte "07".

The second RLP packet is deframed and stored to the deframer output buffer. For RLP2, the deframer output buffer includes a header word 512y for the PPP packet in RLP2, then data for the deframed PPP packet. The first data word in the output buffer includes the byte "05" carried over from the previous RLP packet, which is included at the beginning of the data word. In this example, since the PPP packet ends in this RLP packet, the last partial word ending with the byte "07" is written to the deframer output buffer.

The storage format for the deframer output buffer shown in FIGS. 5A and 5B aligns bytes to word boundaries (to the extent possible). This then relieves the higher layer (e.g., the main controller) from having to perform byte alignment operation on the deframed PPP packets stored in the deframer output buffer. Although byte alignment may be performed by the deframer as one of the tasks in a deframing operation, other deframer designs may omit this byte alignment task and this is also within the scope of the invention.

In an embodiment, upon transferring all valid bytes in an RLP packet to the deframer, a dwrite_done command is issued to the deframer (e.g., by the main controller). The deframer then updates a deframer_length register to indicate the number of PPP packets deframed from the previous RLP packet. A burst read may then be performed to retrieve the deframed PPP packets from the deframer output buffer for the RLP packet just processed, and the next RLP packet may concurrently be provided to the deframer for deframing.

Figure 6A:
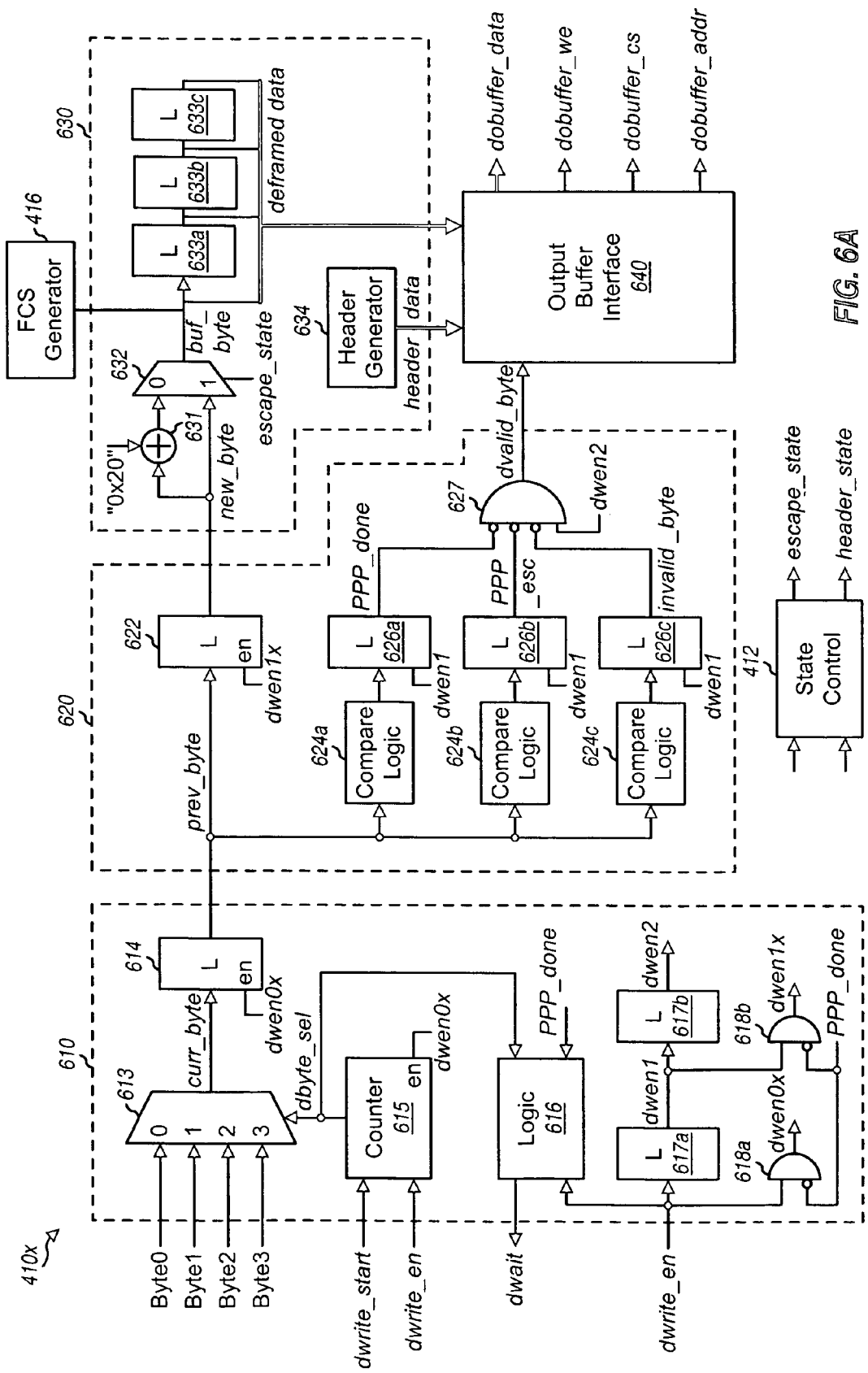
FIGS. 6A and 6B are block diagrams of an embodiment of a deframer.

FIG. 6A is a block diagram of a deframer 410x, which is a specific embodiment of deframer 410 in FIG. 4. Deframer 410x includes state control unit 412 and deframing logic unit 414, which includes an input interface unit 610, a detection unit 620, a conversion unit 630, and an output interface unit 640. A brief description of these units is described below and a more detailed description is provided subsequently.

Input interface unit 610 receives RLP packet data that includes PPP packets to be deframed (e.g., via system bus 228) and control signals (e.g., from main controller 230) and provides the received data, one byte at a time, to detection unit 620. Detection unit 620 detects for certain types of byte in the received data (e.g., flag, escape, and invalid bytes) and provides signals to indicate when these bytes are detected.

Conversion unit 630 performs the processing to deframe the PPP packets, including removal of flag and escape bytes and checking of each complete PPP packet using the FCS value. Conversion unit 630 further provides a header word for each complete or partial PPP packet stored in the deframer output buffer and for the end of the output buffer. Initially, the first time a header word is written for the start of the deframer output buffer or for each new PPP packet, the PPP_length field is not known. An address generator within output interface unit 640 will then point back to the header location after each packet is deframed, and the fcs_pass, PPP_end, and PPP_length information for the header of this processed PPP packet is then updated. In this way, the header is updated at the end of the deframing for each PPP packet whenever the deframer encounters a flag byte. Also, whenever the deframer encounters a dwrite_done command, it jumps back and updates the header. The deframer_length register is used to inform the main controller how many valid headers are included in the deframer output buffer after one RLP packet has been deframed.

Output interface unit 640 receives the header data and deframed PPP packet data and provides this data to the deframer output buffer. Output interface unit 640 further includes an address generator and a control signal generator used to respectively generate addresses and control signals for the output buffer.

Figure 7:
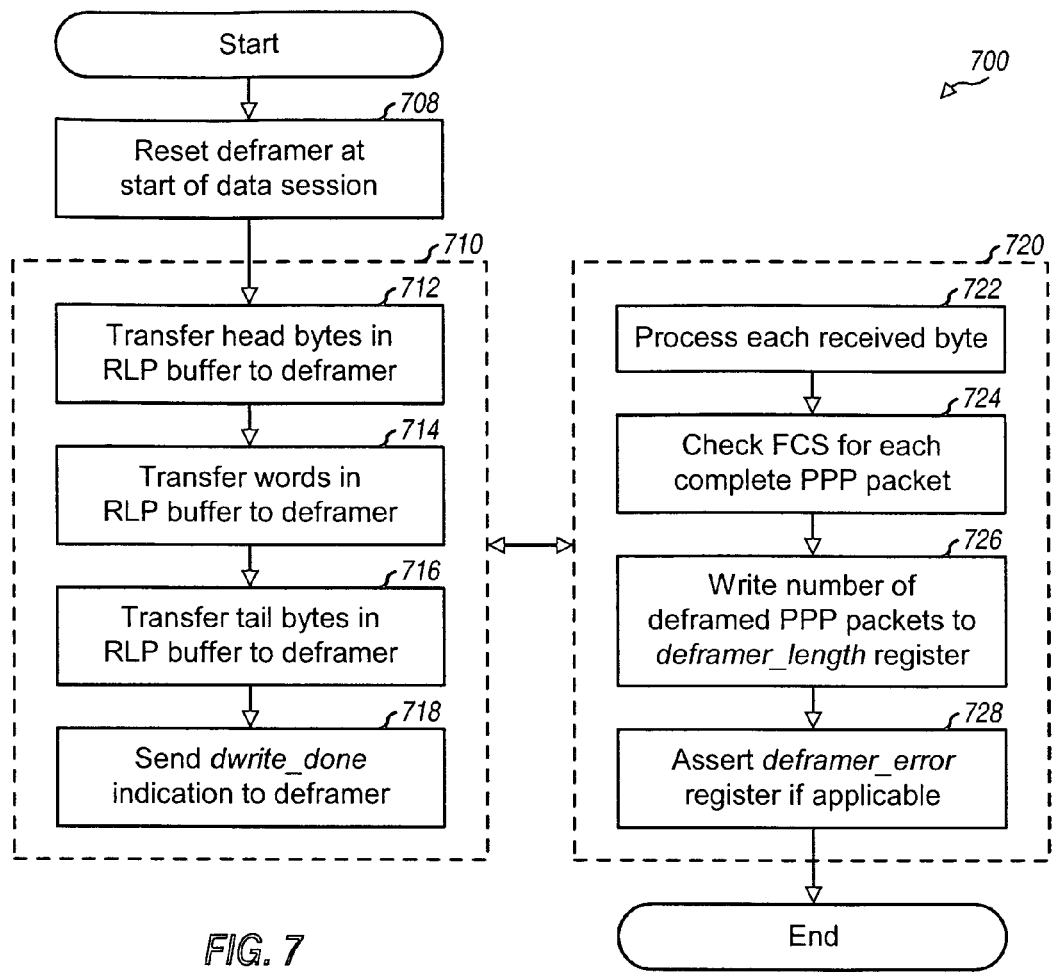
FIG. 7 is a flow diagram of a process for performing deframing.

FIG. 7 is a flow diagram of an embodiment of a process 700 for performing deframing. Process 700 includes the steps to transfer (or write) an RLP packet to the deframer (block 710) and steps to process the RLP packet by the deframer (block 720). These steps may be performed concurrently by different hardware circuitry within the deframer. The deframer may be reset at the beginning of each new data session (step 708).

To deframe an RLP packet, byte transfer may first be performed to write the head bytes of the first partial word in the RLP buffer to the deframer, until word boundary of the RLP buffer is reached (step 712). Word write or burst write may then be performed to write whole words in the RLP buffer to the deframer (step 714). Byte transfer may then be performed to write the tail bytes of the last partial word to the deframer, if the RLP packet does not end at the word boundary (step 716). When all data for the RLP packet in the RLP buffer has been transferred to the deframer, a dwrite_done indication may be sent (e.g., on a dwrite_en signal in FIG. 6A) to the deframer (step 718). The write operation for the next RLP packet may then be performed from the beginning of the RLP buffer.

The deframer checks and processes each byte received from the byte and word transfers (step 722). The deframer prepares a header word if a flag byte is received (and also for the start of the deframer output buffer), removes escape bytes, and increments a counter for the number of valid bytes. The deframer also checks the FCS value for each complete PPP packet (step 724). At the completion of the processing of the RLP packet, the deframer stores in the deframer_length register a value indicating the number of deframed PPP packets stored in the deframer output buffer for the RLP packet just processed (step 726). The deframer may also assert a deframer_error register if any PPP packet byte is written to an address outside of the deframer output buffer limit (step 728).

Figure 8:
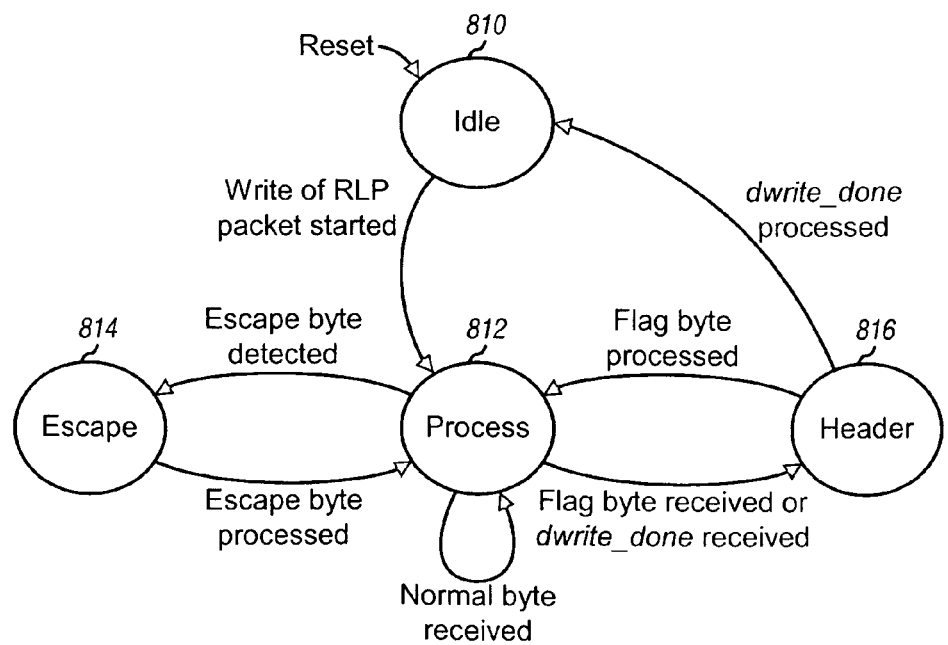
FIG. 8 is a state diagram of an embodiment of the states for the deframer.

FIG. 8 is a state diagram of an embodiment of the states for deframer 410x. In an embodiment, at any given moment, the deframer may be in one of four possible states—an Idle state 810, a Process state 812, an Escape state 814, and a Header state 816.

Idle state 810. The deframer initially starts out in the Idle state upon being reset (e.g., at the start of a data session). The deframer is also in this state before a write is initiated to write an RLP packet to the deframer and after the write is finished. The deframer does not write to the deframer output buffer while it is in this state, but data already stored in the output buffer may be read (e.g., via a burst read by the main controller).

Process state 812. The deframer is in the Process state while the write is being performed to write the RLP packet to the deframer. The RLP packet may include one or more complete and/or partial PPP packets to be deframed. The deframer processes the bytes as they are received and continuously writes deframed data to the deframer output buffer as each word of valid bytes is available (e.g., every fourth valid byte).

Escape state 814. The deframer enters the Escape state whenever the escape byte ("0x7d") is detected for the received byte. In this state, the escape byte is removed and the subsequent byte is un-escaped by XORing it with "0x20". The deframer then returns to the Process state.

Header state 816. The deframer enters the Header state if (1) a flag byte ("0x7e") is received, or (2) the entire RLP packet has been written to the deframer (which may be indicated by receiving the dwrite_done indicator on the dwrite_en signal). As noted above, the most current header in the deframer output buffer is updated when either a flag byte is received or the dwrite_done command is received. The deframer sets the fcs_pass, PPP_end, and PPP_length fields of the header word for the associated PPP packet and writes the header word to the deframer output buffer. In an embodiment, the deframer is in the Header state for one clock cycle to write out the updated header word. If the flag byte was detected, then the deframer returns to the Process state. Otherwise, if the dwrite_done indicator was received, then the deframer returns to the Idle state.

Referring back to FIG. 6A, within input interface unit 610, the RLP packet is written one word at a time to a multiplexer 613. The (up to) four bytes for each received word are then provided one byte at a time from multiplexer 613 for subsequent processing. The selected byte (denoted as curr_byte) is determined by a dbyte_sel control from a counter 615 and is latched by a latch 614. Counter 615 is loaded with an initial value at the start of each RLP packet (i.e., when the write of the RLP packet is initiated by the dwrite_start command). The initial value is the start_offset value for the first valid byte in the RLP buffer (which is 2 for RLP1 in FIG. 5B). Counter 615 thereafter increments by one for each clock cycle so that each byte of the received word is eventually selected, but is temporarily paused when the flag byte is detected so that the header word for the processed PPP packet may be written to the deframer output buffer. This is achieved by driving the enable input of counter 615 with the dwen0x signal. A logic unit 616 provides a dwait signal to indicate when the writing to the deframer should be paused (e.g., when the flag byte is being processed).

A dwrite_en signal is asserted as long as the RLP packet is being written to the deframer. The dwrite_en signal is latched by two series-coupled latches 617a and 617b to provide delayed versions of the signal, dwen1 and dwen2, which are used by detection unit 620 and conversion unit 630, respectively. The dwrite_en and dwen1 signals are also ANDed with the inverted PPP_done signal by AND gates 618a and 618b, respectively, to form the dwen0x and dwen1x, which are used to enable various circuit elements within deframer 410x.

Within detection unit 620, each byte from input interface unit 610 (denoted as prev_byte) is latched by a latch 622 and also provided to comparison logic units 624a, 624b, and 624c. Comparison logic units 624a, 624b, and 624c perform the necessary comparisons to determine whether or not the received byte is a flag byte, an escape byte, or an invalid byte, respectively, and provide signals that are asserted whenever these bytes are detected. Invalid bytes may be defined by the particular protocol or implementation being supported. For example, a data value of "0x7e" may be sent as "0x7e 0x7e", in which case the second "0x7e" is considered invalid. The signals from units 624a, 624b, and 624c are latched by latches 626a, 626b, and 626c to provide the PPP_done, PPP_esc, and invalid_byte signals, respectively. A gate 627 then ANDs these three signals along with the dwen2 signal to provide the dvalid_byte signal that is asserted whenever the received byte is detected as being valid (i.e., not a flag, escape, or invalid byte).

Within conversion unit 630, each byte received from detection unit 620 (denoted as new_byte) is XORed by an XOR gate 631 to un-escape the byte. The received byte and XORed byte are provided to a multiplexer 632, which provides the XORed byte if the deframer is in the Escape state and the received byte otherwise. The Escape state is entered upon detection of an escape byte (i.e., PPP_esc being asserted) and is denoted by the escape_state signal being asserted. The output byte from multiplexer 632 (denoted as buf_byte) is provided to three series-coupled latches 633a, 633b, and 633c, which are used to perform the byte-to-word conversion. FCS generator 416 also receives the output from multiplexer 632 and generates an FCS value used to check each complete PPP packet. A header generator 634 generates a header word for each new PPP packet received by the deframer, and for the start of the deframer output buffer.

Figure 6B:
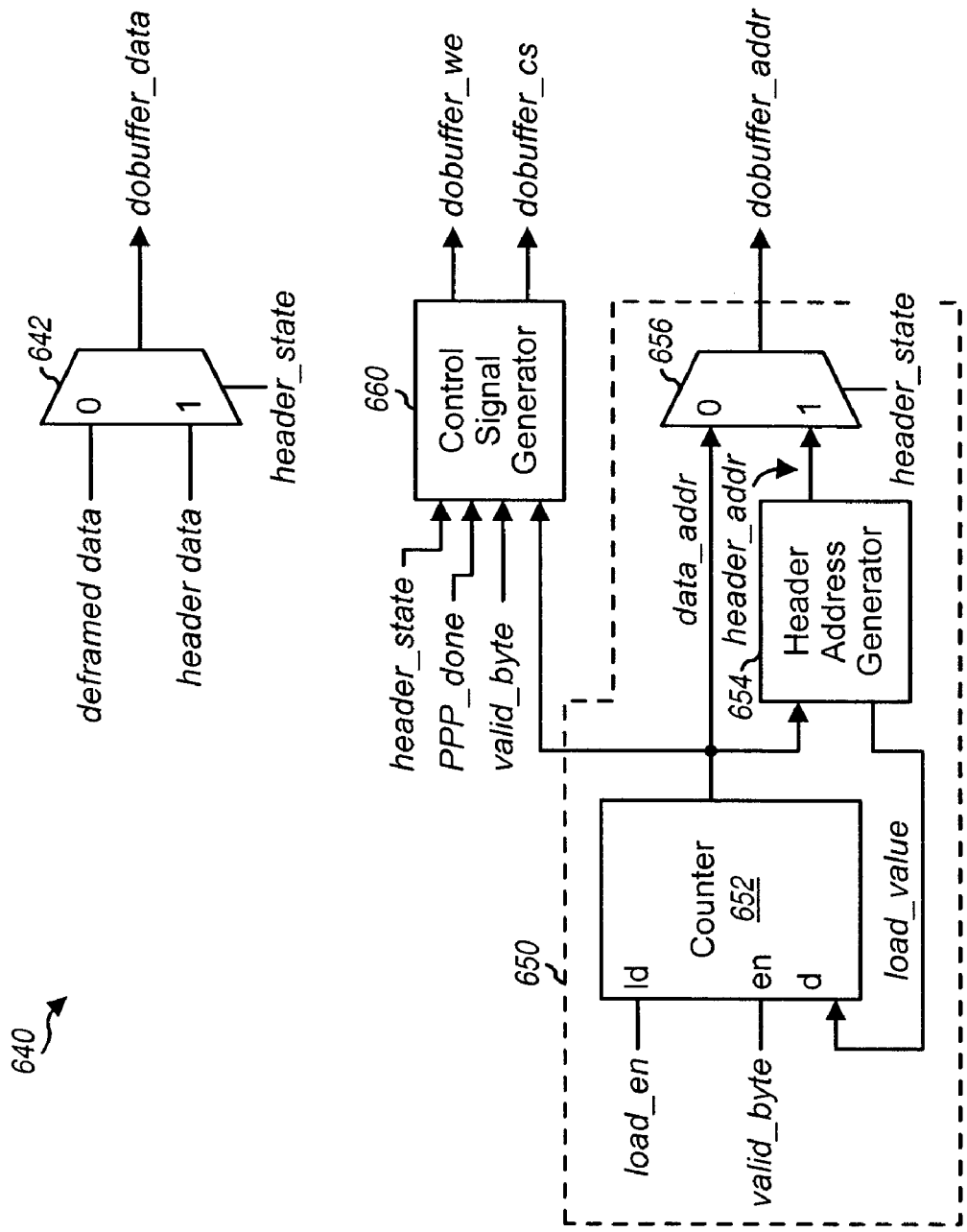

FIG. 6B is a diagram of an embodiment of output interface unit 640. Within buffer interface unit 640, the header word from header generator 634 and the deframed word from latches 633a through 633c are provided to a multiplexer 642, which provides the header word if the deframer is in the Header state and the deframed word otherwise. The Header state is entered upon detection of a flag byte (i.e., PPP_done being de-asserted) and is denoted by the header_state signal being asserted. The output word from multiplexer 642 is then written to the deframer output buffer.

Buffer interface unit 640 also includes an address generator 650 and a control signal generator 660 used to respectively generate the addresses and control signals for writing the deframed PPP packet data to the deframer output buffer. Address generator 650 includes a counter 652 that counts the number of valid bytes written to the deframer output buffer. Counter 652 is loaded with the load_value whenever the load_en signal is asserted. In an embodiment, counter 652 is loaded with a load_value of "0x04" if the load_en signal is asserted due to a deframer reset or a new RLP packet being written to the deframer (as indicated by dwrite_start being asserted) and is loaded with a load_value of header_addr+ "0x04" if the load_en signal is asserted due to the deframer being in the Header state. By loading counter 652 with a load_value of "0x04", the first word in the deframer output buffer is reserved for the header word. At the end of each deframed PPP packet, which is indicated by receipt of a flag byte, the deframer forces a write of the last complete or partial word of the PPP packet to the output buffer.

A header address generator 654 generates the address for the next header word (header_addr). The header_addr for the next PPP packet is generated based on the count value from counter 652 such that the header word is stored at the next word in the deframer output buffer. Generator 654 provides the header_addr to one input of a multiplexer 656 and the load_value to counter 652. The output of counter 652 (except for the two LSBs) is also used as the deframed data address for the deframer output buffer and is provided to the other input of multiplexer 656. Multiplexer 656 then provides the header address if the header word is being written to the deframer output buffer and the data address if a deframed word is being written. Signal generator 660 provides a dobuffer_we signal that is asserted whenever (1) a complete word is to be written to the deframer output buffer (e.g., every fourth valid byte), (2) a partial word is to be written at the end of the PPP packet when the PPP_done signal is asserted and there are unwritten residual bytes, or (3) a header word is to be written.

Figure 9A:
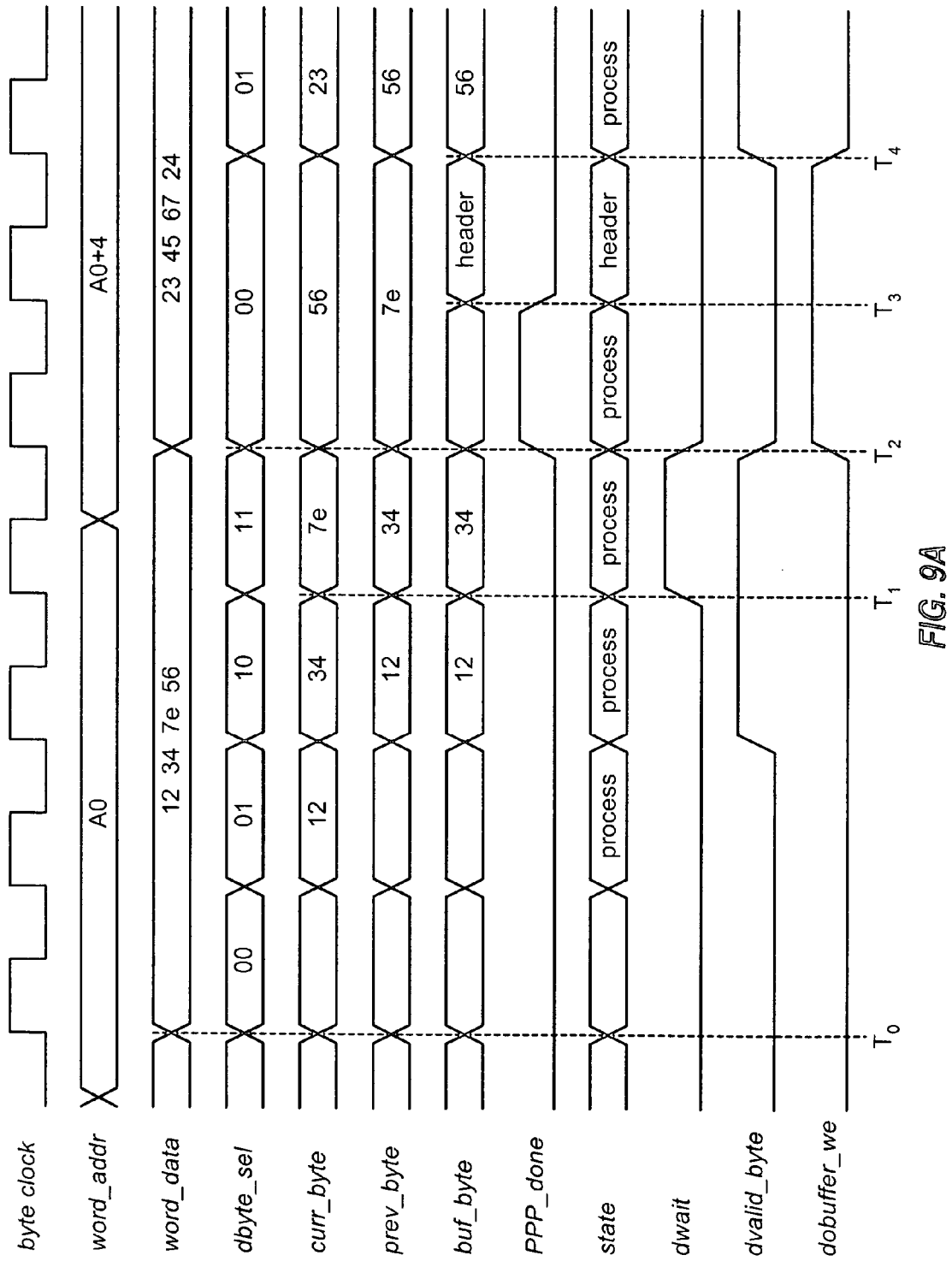
FIGS. 9A and 9B are timing diagrams for some events in deframing data.
Figure 9B:
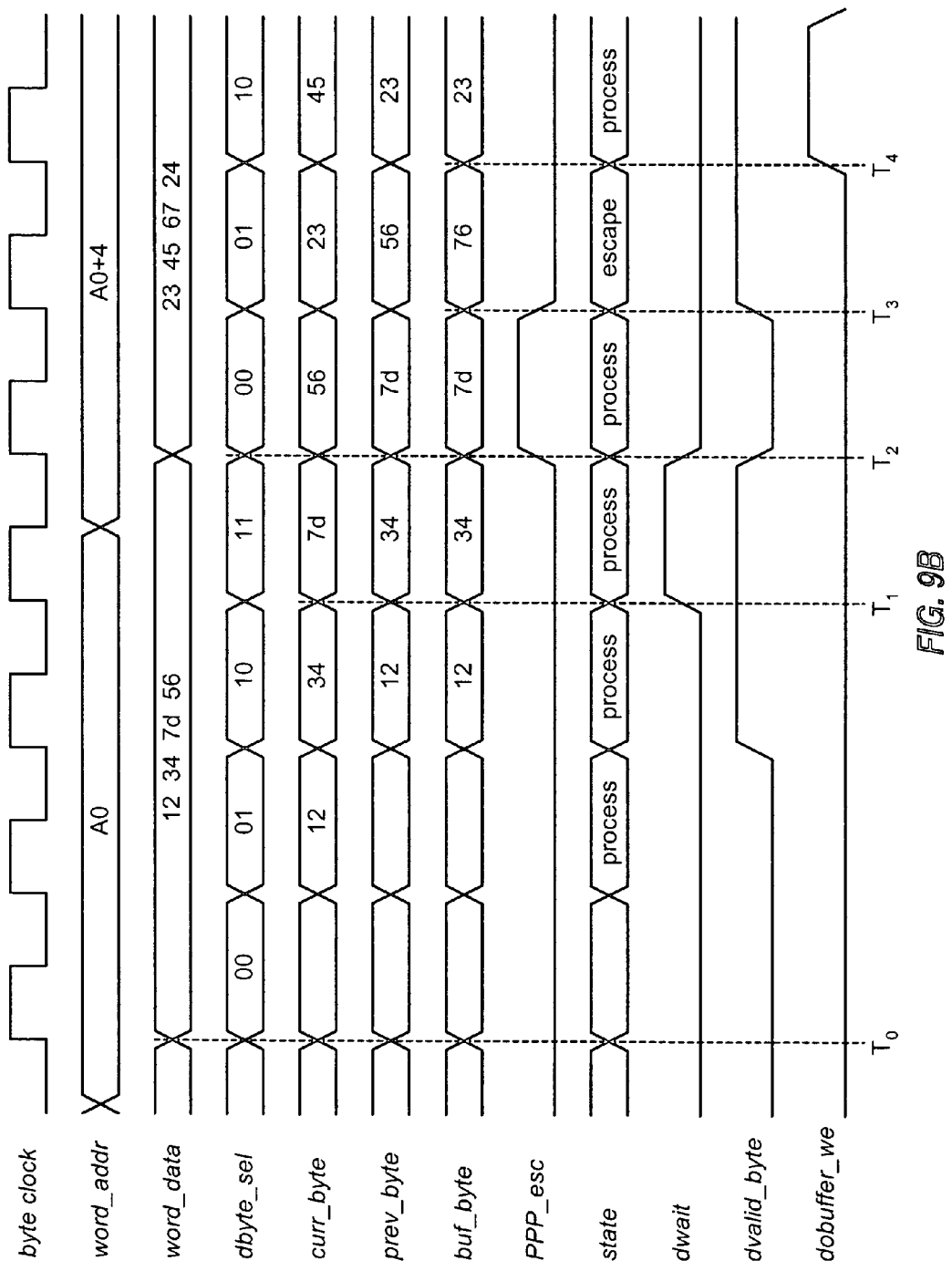

FIGS. 9A and 9B are timing diagrams for some events for a deframing operation performed by the specific deframer design shown in FIGS. 6A and 6B. The RLP packet is written to the deframer in words, one at a time starting at time $T_0$, with each word including up to four bytes. For each received word, the dbyte_sel control sequentially selects each byte of the word for processing.

FIG. 9A shows the processing for a flag byte. Upon detection of the flag byte ("0x7e") at time $T_1$, indicating the start of a new PPP packet, the dwait signal is asserted (i.e., brought to logic high) to temporarily pause the writing of the RLP data to the deframer. At time $T_2$, the PPP_done signal is asserted to indicate the completion of the processing for the prior PPP packet, the dvalid_byte signal is de-asserted to indicate receipt of a non-valid byte (i.e., the flag byte), and the dobuffer_we signal is asserted to force the writing of the last partial word of the prior PPP packet to the deframer output buffer, and the header word for the next PPP packet is generated. At time $T_3$, the deframer enters the Header state and the header word is written to the deframer output buffer. At time $T_4$, the deframer returns to the Process state, processing of the next PPP packet begins, and the dvalid_byte signal is asserted and the dobuffer_we signal is de-asserted.

FIG. 9B shows the processing for an escape byte. Upon selection of the last byte of the received word (e.g., dbyte_sel="11") at time $T_1$, the dwait signal is de-asserted to allow the main controller to move on. At time $T_2$, the PPP_esc signal is asserted to indicate the detection of the escape byte and the dvalid_byte signal is de-asserted to indicate receipt of a non-valid byte (i.e., the escape byte), which is removed. At time $T_3$, the deframer enters the Escape state, the next byte ("0x56") following the escape byte is XORed with "0x20" to provide the escaped byte ("0x76"), and the dvalid_byte signal is asserted. At time $T_4$, the deframer returns to the Process state, processing of the PPP packet continues, and the dobuffer_we signal is asserted to write the four valid bytes, "0x12", "0x34", "0x76", and "0x78", to the deframer output buffer.

HDLC Framing

For a framing operation, the framer is provided with data to be framed, performs framing tasks, and provides framed PPP packets. Each framed PPP packet includes the flag, address, control, protocol, information, padding, and FCS fields, as shown in FIG. 3A. In an embodiment, framer performs the following set of tasks for each framed PPP packet:

Append a flag byte at the beginning of the framed PPP packet.

Replace each byte of "0x7e" with two bytes of "0x7d 0x5e".

Replace each byte of "0x7d" with two bytes of "0x7d 0x5d".

Replace each byte from "0x00" to "0x1f" with an escape byte ("0x7d") followed by that byte, if the ACCM is configured this way.

Generate and append an FCS value for the PPP packet.

Store the framed PPP packet to the framer output buffer.

In an embodiment, the data to be framed (e.g., RLP packet data) is provided to the framer in a write operation. The framer then provides framed PPP packets by appending the flag byte and escaping some special characters based on the defined ACCM.

Referring back to FIG. 3A, the framer receives PPP packet data comprised of fields 314 through 322. The framer appends a flag byte for field 312 and an FCS value for field 324 and provides the framed PPP packet comprised of fields 312 through 324, which are stored to the framer output buffer.

Figure 10:
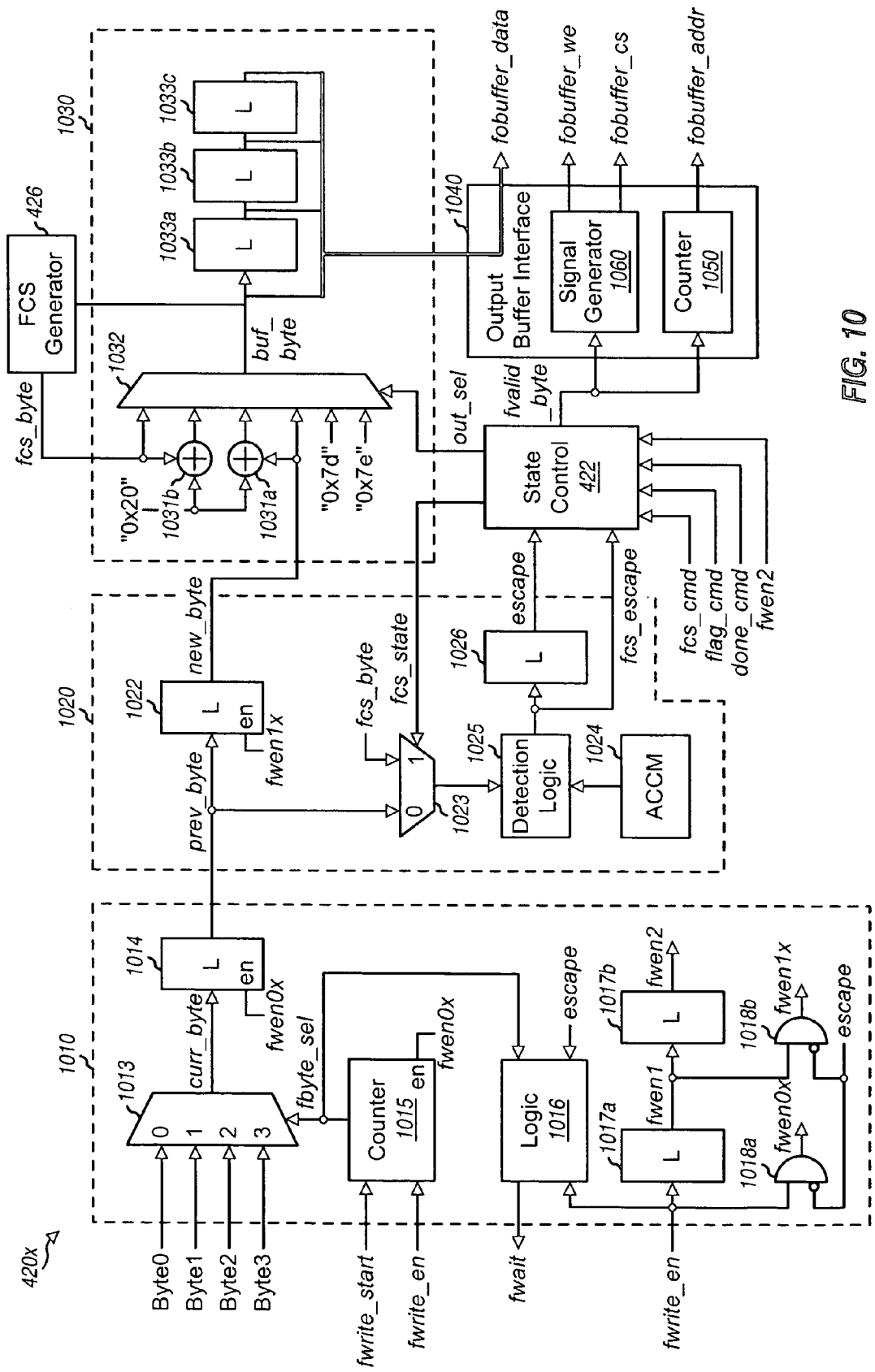
FIG. 10 is a block diagram of an embodiment of a framer.

FIG. 10 is a block diagram of a framer 420x, which is a specific embodiment of framer 420 in FIG. 4. Framer 420x includes state control unit 422 and framing logic unit 424, which includes an input interface unit 1010, a decoding unit 1020, a conversion unit 1030, and an output interface unit 1040. A brief description of these units is described below and a more detailed description is provided subsequently.

Input interface unit 1010 receives data to be framed and control signals and provides the received data, one byte at a time, to decoding unit 1020. Decoding unit 1020 detects for special bytes in the received data and provides an indication when each such byte is detected. Conversion unit 1030 performs the processing to frame the received data, including insertion of flag and escape bytes, escaping the special bytes, and generation and insertion of an FCS value for each framed PPP packet. Output interface unit 1040 receives the framed PPP packet data and provides this data to the framer output buffer. Output interface unit 1040 further includes an address generator and a control signal generator used to respectively generate addresses and control signals for writing data to the output buffer.

Figure 11:
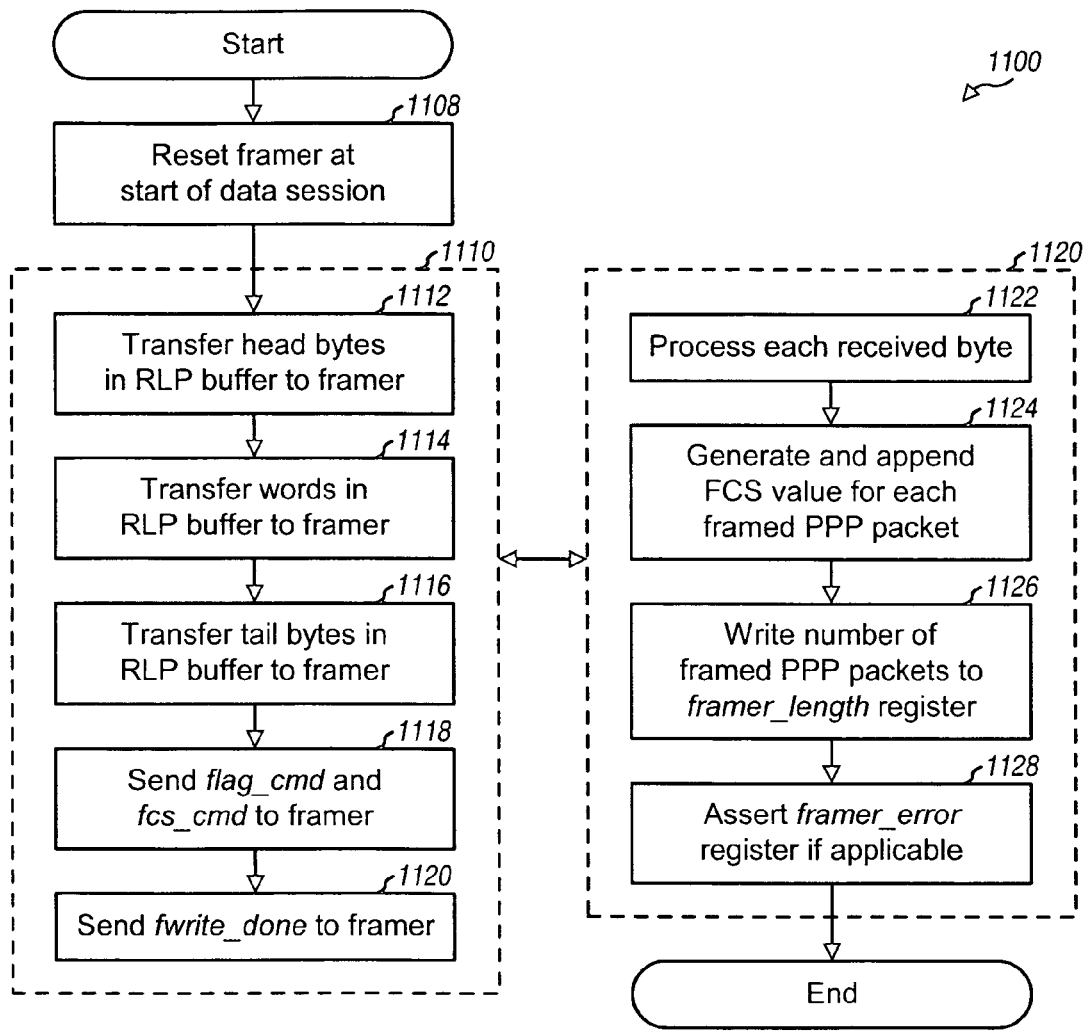
FIG. 11 is a flow diagram of a process for performing framing.

FIG. 11 is a flow diagram of an embodiment of a process 1100 for performing framing. Process 1100 includes the steps to transfer data to be framed to the framer (block 1110) and steps to process the data to provide the framed PPP packets (block 1120). In an embodiment, the data to be framed is provided from the RLP buffer (e.g., from a communication received via the wireless link). These steps may be performed concurrently by different hardware circuitry within the framer. The framer may be reset at the beginning of each new data session (step 1108).

For each framing operation, byte transfer may first be performed to write the head bytes of the first partial word to be framed from the RLP buffer to the framer, until word boundary is reached (step 1112). Word write may then be performed to write whole words in the RLP buffer to the framer (step 1114). Byte transfer may then be performed to write the tail bytes of the last partial word to the framer, if the RLP data does not end at the word boundary (step 1116). For each PPP packet, commands to insert the flag byte and the FCS value are also provided to the framer (step 1118). When the entire content of the RLP buffer has been written to the framer, an fwrite_done indicator may be provided to the framer so that the write operation for the framing of the next RLP packet may be performed starting at the beginning of the RLP buffer (step 1120).

The framer checks and processes each byte received from the byte and word transfers (step 1122). The framer inserts a flag byte whenever directed, inserts escape bytes as necessary, and "escapes" each special byte ("e.g., "0x00" to "0x1f") that may be defined an ACCM control bit. The framer also generates an FCS value for each framed PPP packet and appends the FCS value when directed (step 1124). At the completion of the processing of received data, as indicated by the fwrite_done indicator, the framer stores in a framer_length register a value indicating the number of framed PPP packets stored in the framer output buffer (step 1126). The framer may also assert aframer_error register if any framed PPP packet byte is written to an address outside of the framer output buffer limit (step 1128).

Figure 12:
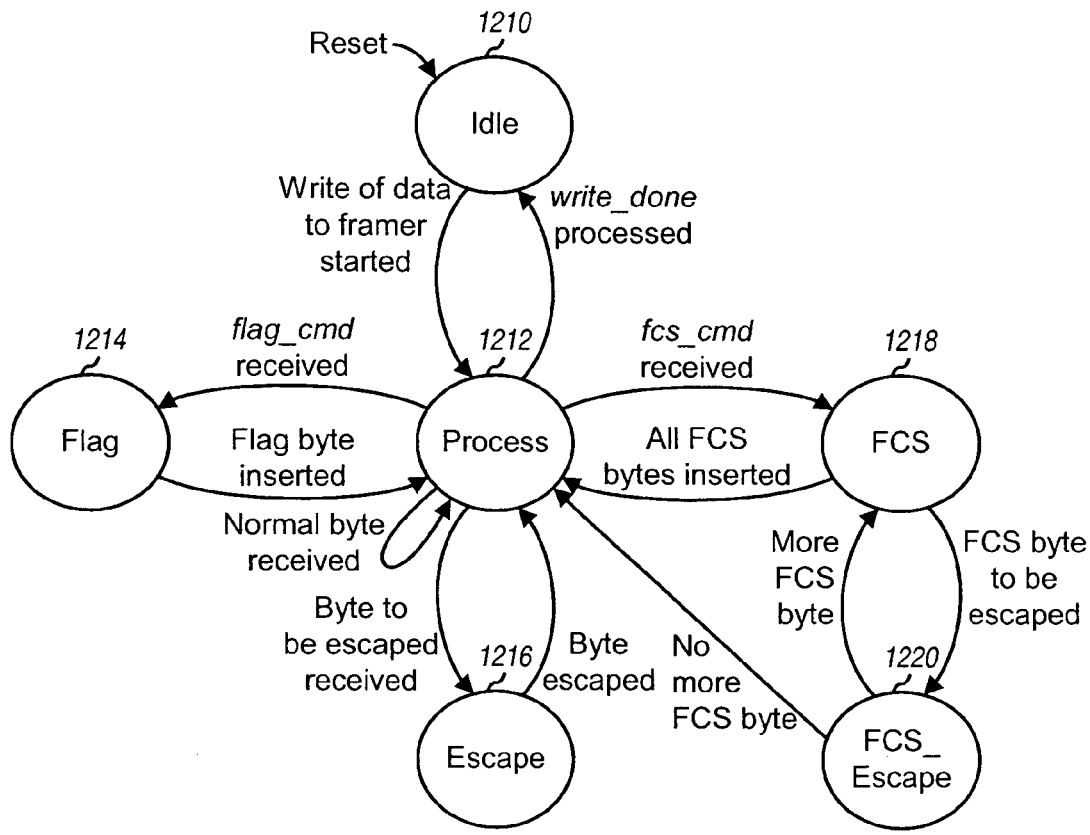
FIG. 12 is a state diagram of an embodiment of the states for the framer.

FIG. 12 is a state diagram of an embodiment of the states for framer 420x. In an embodiment, at any given moment, the framer may be in one of six possible states—an Idle state 1210, a Process state 1212, a Flag state 1214, an Escape state 1216, an FCS state 1218, and an FCS_escape state 1220.

- Idle state 1210. The framer initially starts out in the Idle state upon being reset. The framer is also in this state before a write is initiated to write data to be framed to the framer and after the write is finished. The framer does not write to the framer output buffer while it is in this state, but data already stored in the output buffer may be read.

- Process state 1212. The framer is in the Process state while the write is being performed to write data to the framer. The framer processes each received byte and continuously writes framed data to the framer output buffer as each word is available. If the received byte needs to be escaped, then the framer provides an escape byte ("0x7d") followed by the escaped byte (i.e., the received byte with bit 5 inverted).

- Flag state 1214. The framer enters the Flag state when a flag_cmd is received. In this state, the framer provides a flag byte for the next PPP packet. The framer stays in this state for one cycle to provide the flag byte and thereafter returns to the Process state.

- Escape state 1216. The framer enters the Escape state whenever a byte that needs to be escaped is received. For each such byte, the framer provides an escape byte ("0x7d") while it is still in the Process state and then enters the Escape state to provide the escaped byte. The framer stays in the Escape state for one cycle to process the escaped byte and thereafter returns to the Process state.

- FCS state 1218. The framer enters the FCS state when an fcs_cmd is received. In this state, the framer appends the FCS value to the end of the PPP packet and writes this value to the framer output buffer. If the FCS value includes any byte that needs to be escaped, then the framer enters the FCS_escape state to process such a byte.

- FCS_escape state 1220. The framer enters the FCS_escape state whenever the FCS value includes a byte that needs to be escaped. The framer performs the same processing for each such byte as in the Escape state. However, the framer thereafter returns to the FCS state if an additional FCS byte needs to be processed.

Referring back to FIG. 10, within input interface unit 1010, the data to be framed is written one word at a time to a multiplexer 1013. Since one "normal" byte may be processed in one clock cycle but a special byte that needs to be escaped is processed in two cycles, the word (of up to four bytes) is maintained at the multiplexer input for any where between one to eight cycles, depending on the number of bytes in the word and the value of each byte. The (up to) four bytes for each received word are then provided one byte at a time from multiplexer 1013 for subsequent processing. The selected byte (denoted as curr_byte) is determined by an fbyte_sel control from a counter 1015 and is latched by a latch 1014. Counter 1015 counts the number of bytes received and processed by the framer and is temporarily paused (for one clock cycle) if the received byte needs to be escaped. Counter 1015 may be implemented similar to counter 615 in FIG. 6A. A logic unit 1016 provides an fwait signal to indicate when the writing to the framer should be paused (e.g., whenever a byte that needs to be escaped is received).

An fwrite_en signal is asserted as long as data to be framed is written to the framer. The fwrite_en signal is latched by two series-coupled latches 1017a and 1017b to provide delayed versions of the signal, fwen1 and fwen2, which are used by detection unit 1020 and conversion unit 1030, respectively.

Within detection unit 1020, each byte from input interface unit 1010 (denoted as prev_byte) is latched by a latch 1022 and also provided to one input of a multiplexer 1023. Multiplexer 1023 also receives an FCS byte on the other input, and provides the FCS byte if the framer is in the FCS state and the data byte otherwise. An ACCM unit 1024 provides a control indicating whether or not certain bytes are to be escaped. A detection logic 1025 then determines whether or not the received byte needs to be escaped based on the control from ACCM unit 1024 and provides an fcs_escape signal indicating this condition. This signal is latched by a latch 1026 to provide an escape signal.

State control unit 422 receives the fwen2 signal from input interface unit 1010, the fcs_escape and escape signals from detection unit 1020, and the fcs_cmd, flag_cmd, and done_cmd (e.g., from main controller 230). State control unit 422 then provides an fvalid_byte signal that is asserted whenever the received byte is detected as being valid, an fcs_state signal that indicates if the framer is in the FCS state, and an out_sel control used to provide the proper output byte.

Within conversion unit 1030, each byte received from detection unit 1020 (denoted as new_byte) is XORed by an XOR gate 1031a to un-escape the byte. Similarly, each FCS byte from FCS generator 426 is also XORed by an XOR gate 1031b to un-escape the byte. The received data byte, XORed data and FCS bytes respectively from XOR gates 1031a and 1031b, FCS byte, escape byte ("0x7d"), and flag byte ("0x7e") are provided to six inputs of a multiplexer 1032. Multiplexer 1032 then provides one of the input bytes as the output byte (denoted as buf_byte) based on the out_sel control from state control unit 422. The buf_byte is provided to three series-coupled latches 1033a, 1033b, and 1033c, which are used to perform the byte-to-word conversion. FCS generator 426 also receives the output from multiplexer 1032 and generates the FCS value to be appended to each framed PPP packet.

Within output interface unit 1040, the word from latches 1033a through 1033c is provided as fobuffer_data to the framer output buffer. Buffer interface unit 1040 also includes a counter 1050 and a control signal generator 1060 used to respectively provide addresses and control signals for writing the framed PPP packets to the framer output buffer. Counter 1050 counts the number of bytes written to the framer output buffer. In an embodiment, counter 1050 is reset at system startup, upon receiving a software command, or at the beginning of the write operation into an empty output buffer. Signal generator 1060 provides an fobuffer_we signal that is asserted whenever a word is to be written to the framer output buffer, which is typically every fourth byte but may be shorter for the last partial word to be written for the framed PPP packet.

Figure 13:
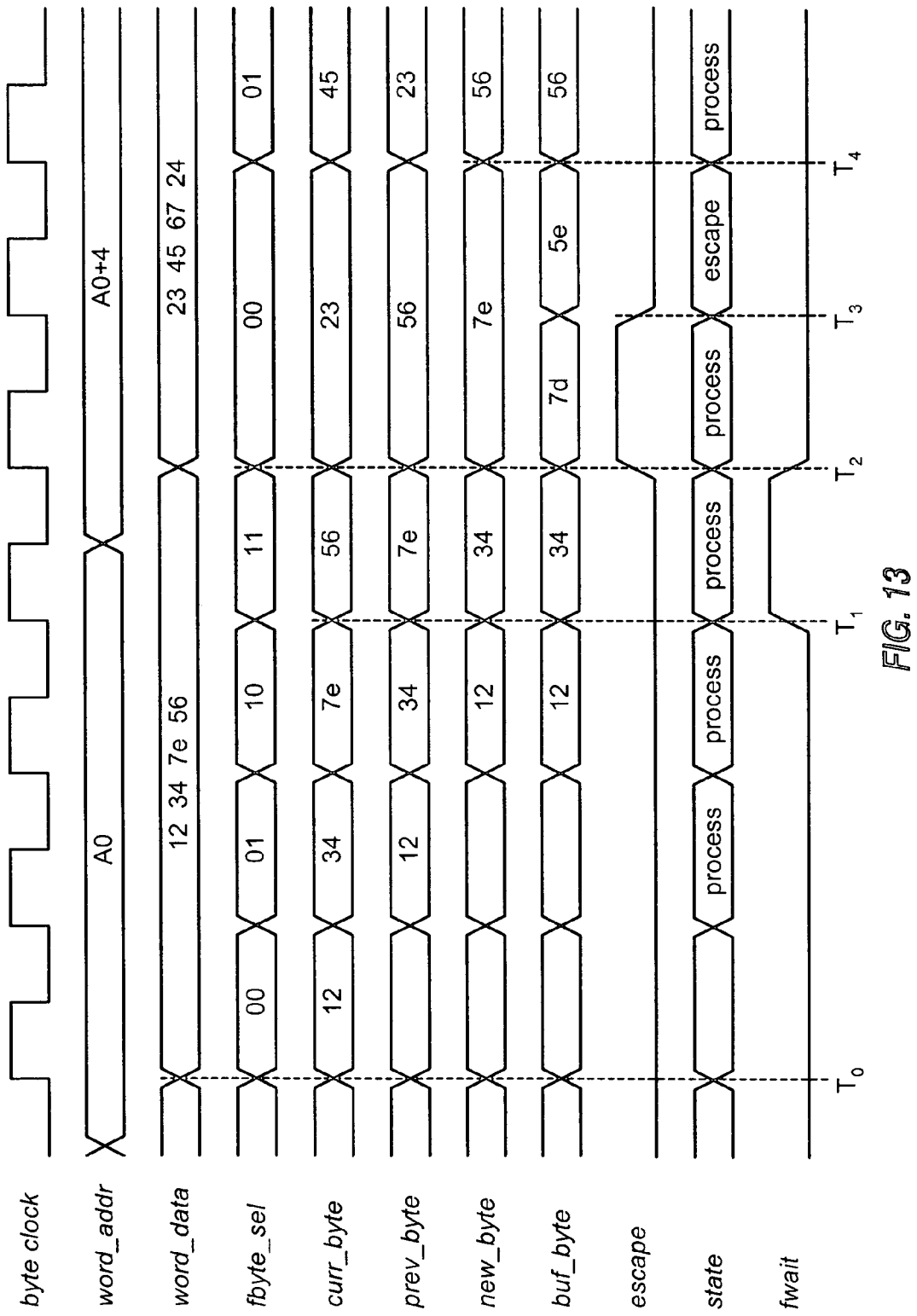
FIG. 13 is a timing diagram for some events in framing data.

FIG. 13 is a timing diagram for some events for a framing operation performed by the specific framer design shown in FIG. 10. The data to be framed is written to the framer in words, one at a time starting at time $T_0$, with each word including up to four bytes. For each received word, the fbyte_sel control sequentially selects each byte of the word for processing.

Upon detection of a byte ("0x7e") that needs to be escaped at time $T_1$, the fwait signal is asserted to temporarily pause the writing of data to the framer. At time $T_2$, the escape signal is asserted to indicate the detection of a byte that needs to be escaped, and the escape byte ("0x7d") is provided as the output byte. At time $T_3$, the framer enters the Escape state, the received byte ("0x7e") is escaped by XORing it with the value ("0x20"), and the escaped byte ("0x5e") is provided as the output byte. At time $T_4$, the framer returns to the Process state and processing of the received bytes continues.

Figure 14:
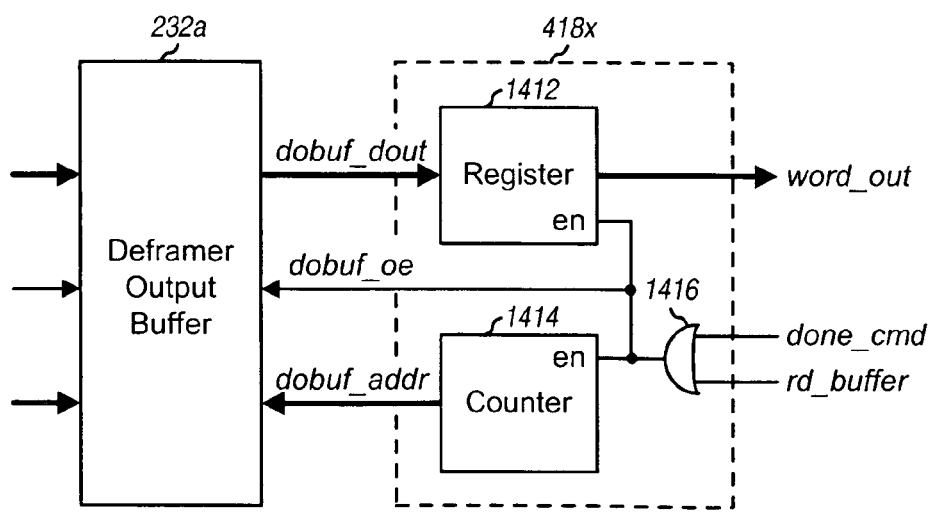
FIG. 14 is a diagram of an embodiment of an output buffer interface unit.

FIG. 14 is a diagram of an embodiment of an output buffer interface unit 418x that may be used to read data from the deframer or framer output buffer. Buffer interface unit 418x may be used for each of buffer interface units 418 and 428 in FIG. 4, but is described below for buffer interface unit 418. Within interface unit 418x, a register 1412 is used to temporarily store a word retrieved from the deframer output buffer and a counter 1414 is used to generate the address for the buffer. An OR gate receives a rd_buffer signal and a done_cmd signal (e.g., from main controller 230) and provides the buffer output enable (dobuf_oe) signal. The dobuf_oe signal is asserted if (1) the reading of the output buffer is enabled, which is indicated by the rd_buffer signal being asserted, or (2) writing of the data to be framed is completed, which is indicated by the done_cmd signal being asserted. The dobuf_oe signal is also used to enable the incrementing of counter 1414.

Frame Check Sequence Generators

For both deframing and framing operations, FCS generators are used to generate an FCS value for each complete PPP packet that is deframed or framed. The FCS value is used to check whether the packet is received correctly or in error. Various error detection coding schemes may be implemented by the FCS generators, such as CRC.

Figure 15A:
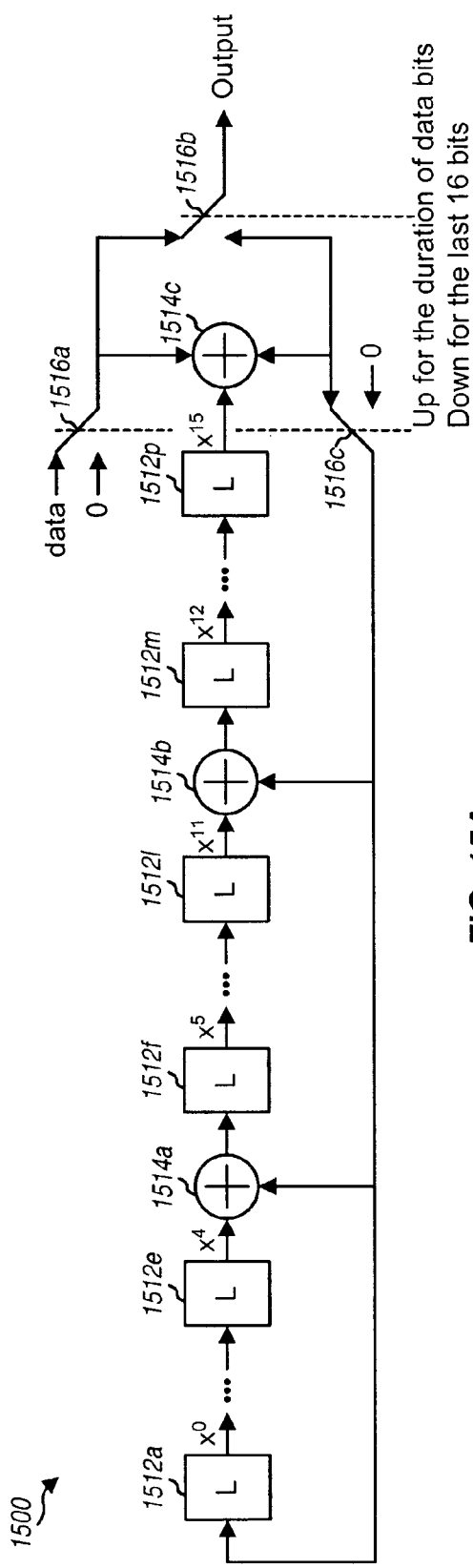
FIG. 15A is a diagram of an embodiment of a bit-wise CRC generator.

FIG. 15A is a diagram of an embodiment of a bit-wise CRC generator 1500 that implements the polynomial $x^{16}+x^{12}+x^5+x$ defined by RFC1662. CRC generator 1500 includes 16 1-bit latches 1512a through 1512p coupled in series. A modulo-2 adder 1514a is inserted between latches 1512e and 1512f, a modulo-2 adder 1514b is inserted between latches 1512l and 1512m, and a modulo-2 adder 1514c is coupled to the output of latch 1512p. Adder 1514c receives the data for a PPP packet, one bit at a time, during CRC generation and a zero bit while the CRC value is being read out from latches 1512. Switches 1516a through 1516c are in the UP position during CRC generation and the DOWN position while reading out the CRC value.

Figure 15B:
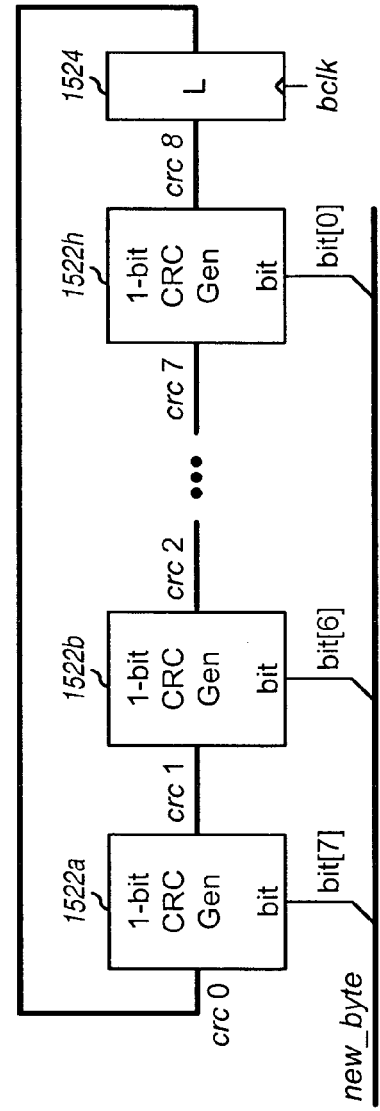
FIGS. 15B through 15D are diagrams of an embodiment of a byte-wise CRC generator.

FIG. 15B is a diagram of an embodiment of a byte-wise CRC generator 1520 that implements the polynomial $x^{16}+x^{12}+x^5+x$. CRC generator 1520 can receive a byte of data on each clock cycle and update its internal state within one clock cycle. CRC generator 1520 includes eight 1-bit CRC generators 1522a through 1522h and an 8-bit latch 1524 coupled in series in a loop. Each 1-bit CRC generator 1522 receives a 16-bit output from a preceding generator (or latch) and a respective bit of the data byte, updates its state based on the received data, and provides a 16-bit output to the following generator (or latch). After all data bytes for a PPP packet have been CRC encoded, the CRC value for the packet can be read from latch 1524.

Figure 15C:
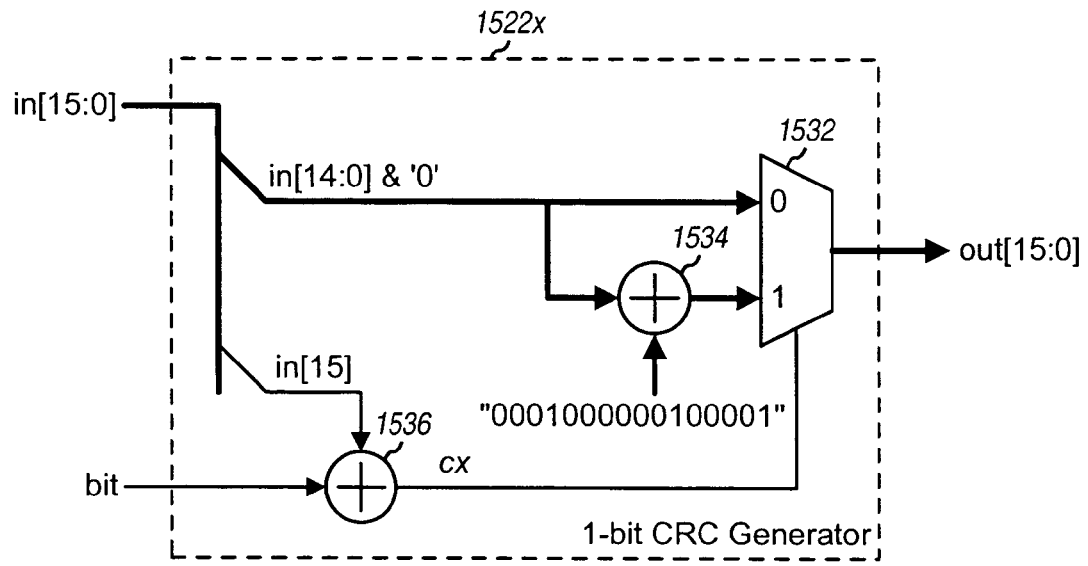

FIG. 15C is a diagram of an embodiment of a 1-bit CRC generator 1522x, which may be used for each of 1-bit CRC generators 1522a through 1522h in FIG. 15B. CRC generator 1522x receives a 16-bit input from a preceding stage and one bit of a data byte to be CRC encoded. The 15 least significant bits (LSBs) of the 16-bit input is multiplied by two and provided to one input of a multiplexer 1532 and to a 16-bit adder 1534. Adder 1534 adds the received 16-bit value with "0b0001000000100001" (or "0x1021", for the polynomial $x^{16}+x^{12}+x^5+x$) and provides the result to the other input of multiplexer 1532. The most significant bit (MSB) of the 16-bit input is modulo-2 added with the data bit by a modulo-2 adder 1536, and the resultant bit, cx, is provided to multiplexer 1532 and used to select one of the inputs. The output of multiplexer 1532 comprises the 16-bit output of 1-bit CRC generator 1522x.

Figure 15D:
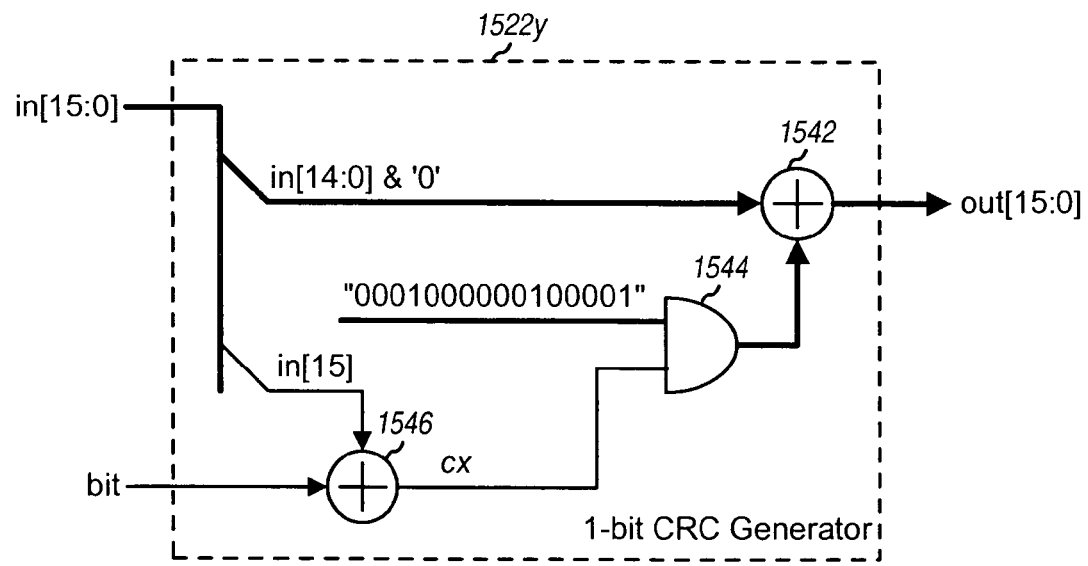

FIG. 15D is a diagram of an embodiment of a 1-bit CRC generator 1522y, which may also be used for each of 1-bit CRC generators 1522a through 1522h in FIG. 15B. CRC generator 1522y also receives a 16-bit input from a preceding stage and one bit of a data byte to be CRC encoded. The MSB of the 16-bit input is modulo-2 added with the data bit by a modulo-2 adder 1546, and the resultant bit, cx, is provided to an AND gate 1544. AND gate 1544 also receives "0x1021" and provides "0x1021" if the cx bit is logic high and a zero if the cx bit is logic low. The 15 LSBs of the 16-bit input is multiplied by two and added with the 16-bit output from AND gate 1544 by a 16-bit adder 1542, and the 16-bit output from adder 1542 comprises the 16-bit output of 1-bit CRC generator 1522y.

The byte-wise CRC design shown in FIGS. 15B through 15D may be modified to perform multi-bit CRC generation for any number of bits. In general, the number of bits to be passed between the 1-bit CRC generators 1522 is determined by the order of the polynomial being implemented, and the number of stages is determined by the number of bits to be CRC encoded concurrently. The multi-bit CRC generator may be advantageously used in high data rate applications, such as for wireless communication systems and data networks.

The CRC (or FCS) value may also be generated based on a look-up table as is known in the art.

In the embodiments described above, the deframing and framing are performed for each received byte, even though a word of multiple bytes is written to the deframer and framer. In other embodiments, the deframing and framing may be performed on an entire word at a time, which can shorten the deframing and framing time.

The HDLC accelerator described herein may be advantageously used for wireless communication devices (e.g., terminals, cellular telephones, handsets, and so on). The HDLC accelerator may also be used in other communication devices and electronic units (e.g., network equipment).

The HDLC accelerator described herein may be implemented by various means. For example, the HDLC accelerator (i.e., the deframer, framer, or both) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A multi-bit cyclic redundancy checking (CRC) generator, comprising:
   a latch operative to store an N-bit value; and
   a plurality of (M) 1-bit CRC generators coupled in series and in a loop with the latch, wherein each 1-bit CRC generator is operative to receive an N-bit value from a preceding 1-bit CRC generator or the latch and a respective input data bit, scale N−1 least significant bits (LSBs) of the received N-bit value by two, selectively add the scaled value with a predetermined value corresponding to a polynomial being implemented, and provide the selectively added result as an N-bit output for the 1-bit CRC generator.

2. The multi-bit CRC generator of claim 1, wherein M is eight.

3. The multi-bit CRC generator of claim 1, wherein N is 16.

4. The multi-bit CRC generator of claim 1, wherein each of the 1-bit CRC generator includes
   a first adder operative to add a most significant bit (MSB) of the received N-bit value with the input data bit to provide a control value,
   a second adder operative to add the scaled value with the predetermined value to provide a summed value, and
   a multiplexer operative to provide the scaled value if the control value is zero and the summed value if the control value is one, wherein the multiplexer output is the N-bit output for the 1-bit CRC generator.

5. The multi-bit CRC generator of claim 4, wherein the first adder is operative to modulo-2 add the most significant bit (MSB) of the received N-bit value with the input data bit.

6. The multi-bit CRC generator of claim 1, wherein each of the 1-bit CRC generator includes
   a first adder operative to add a most significant bit (MSB) of the received N-bit value with the input data bit to provide a control value,
   a gate operative to provide the predetermined value if the control value is one and a zero if the control value is zero, and
   a second adder operative to add the scaled value with an output value from the gate to provide the N-bit output for the 1-bit CRC generator.

7. The multi-bit CRC generator of claim 6, wherein the first adder is operative to modulo-2 add the most significant bit (MSB) of the received N-bit value with the input data bit.

8. The multi-bit CRC generator of claim 1, wherein the multi-bit CRC generator is further operable to receive a byte of data of each clock cycle and update each of the N-bit output for the 1-bit CRC generator within the clock cycle.

9. The multi-bit CRC generator of claim 1, wherein each respective input data bit is received from a byte of data from a PPP packet.

10. The multi-bit CRC generator of claim 9, wherein the N-bit value stored in the latch includes a CRC value for the PPP packet after all data bytes from the PPP packet have been received.

11. A method for cyclic redundancy checking (CRC), comprising:
    receiving, by each of a plurality of (M) 1-bit CRC generators and a latch organized in a loop, an N-bit value from a preceding 1-bit CRC generator or the latch;
    receiving, by each of the plurality of (M) 1-bit CRC generators, an input data bit;
    scaling, by each of the plurality of (M) 1-bit CRC generators, N−1 least significant bits (LSBs) of the N-bit value;
    selectively adding, by each of the plurality of (M) 1-bit CRC generators, the scaled value with a predetermined value corresponding to a polynomial; and
    transmitting the selectively added result as an N-bit output value.

12. The method of claim 11, wherein M is eight.

13. The method of claim 11, wherein N is 16.

14. The method of claim 11, wherein the selectively adding further comprises:
    adding a most significant bit (MSB) of the received N-bit value with the input data bit to provide a control value;
    adding the scaled value with the predetermined value to provide a summed value; and
    selecting the N-bit output value from the scaled value if the control value is zero and the summed value if the control value is one.

15. The method of claim 14, wherein the adding the most significant bit (MSB) of the received N-bit value with the input data bit to provide the control value further comprises modulo-2 adding the most significant bit (MSB) of the received N-bit value with the input data bit.

16. The method of claim 11, wherein the selectively adding further comprises:
    adding a most significant bit (MSB) of the received N-bit value with the input data bit to provide a control value;
    selecting the predetermined value if the control value is one and a zero if the control value is zero; and
    adding the scaled value with the control value to produce the N-bit output value.

17. The method of claim 16, wherein the adding the most significant bit (MSB) of the received N-bit value with the input data bit to provide the control value further comprises modulo-2 adding the most significant bit (MSB) of the received N-bit value with the input data bit.

18. The method of claim 11, wherein the input data bit is received from a byte of data from a PPP packet.

19. The method of claim 18 further comprising
    producing a CRC value for the PPP packet from the N-bit value stored in the latch after all data bytes from the PPP packet have been received.

20. An apparatus comprising:
    means for receiving, by each of a plurality of (M) 1-bit CRC generators and a latch organized in a loop, an N-bit value from a preceding 1-bit CRC generator or the latch;
    means for receiving, by each of the plurality of (M) 1-bit CRC generators, an input data bit;
    means for scaling, by each of the plurality of (M) 1-bit CRC generators, N−1 least significant bits (LSBs) of the N-bit value;
    means for selectively adding, by each of the plurality of (M) 1-bit CRC generators, the scaled value with a predetermined value corresponding to a polynomial; and
    means for transmitting the selectively added result as an N-bit output value.

* * * * *

UNITED STATES PATENT AND TRADEMARK OFFICE
CERTIFICATE OF CORRECTION

PATENT NO. : 7,606,266 B2  Page 1 of 1
APPLICATION NO. : 11/431804
DATED : October 20, 2009
INVENTOR(S) : Abrol et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 691 days.

Signed and Sealed this

Fifth Day of October, 2010

David J. Kappos
*Director of the United States Patent and Trademark Office*